US012644999B2

(12) United States Patent
Iniewski et al.

(10) Patent No.: US 12,644,999 B2
(45) Date of Patent: Jun. 2, 2026

(54) # RADIATION DETECTORS HAVING IMPROVED OUTPUT COUNT RATE EQUALIZATION AND METHODS OF OPERATING THE SAME

(71) Applicant: REDLEN TECHNOLOGIES, INC., Saanichton (CA)

(72) Inventors: Krzysztof Iniewski, Port Moody (CA); Olivier Tousignant, Brentwood Bay (CA); Elmaddin Guliyev, Vancouver (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 275 days.

(21) Appl. No.: 18/594,642

(22) Filed: Mar. 4, 2024

(65) Prior Publication Data

US 2024/0302549 A1 Sep. 12, 2024

Related U.S. Application Data

(60) Provisional application No. 63/488,890, filed on Mar. 7, 2023.

(51) Int. Cl.

| | |
|---|---|
| ***G01T 1/24*** | (2006.01) |
| ***G01N 23/046*** | (2018.01) |
| ***G01T 7/00*** | (2006.01) |

(52) U.S. Cl.

CPC ........... *G01T 1/247* (2013.01); *G01N 23/046* (2013.01); *G01T 7/005* (2013.01); *G01N 2223/303* (2013.01); *G01N 2223/501* (2013.01)

(58) Field of Classification Search

None

See application file for complete search history.

(56) References Cited

U.S. PATENT DOCUMENTS 10,261,196 B2 4/2019 Goederer et al.
11,344,266 B2 5/2022 Iniewski et al.

(Continued)

OTHER PUBLICATIONS

Jurdit, M. et al., "Characterization of spectrometric photon-counting X-ray detectors at different pitches," Journal of Instrumentation, vol. 12, Sep. 2017, pp. 1-18, DOI 10.1088/1748-0221/12/09/T09008.

(Continued)

*Primary Examiner* — Edwin C Gunberg

(74) *Attorney, Agent, or Firm* — THE MARBURY LAW GROUP PLLC

(57) ABSTRACT

A method of calibrating a pixelated radiation detector containing a plurality of pixel detectors electrically connected to a plurality of respective read-out channels of detector read-out circuitry includes determining a sensor material deadtime, $\tau_{sensor}$, for each of the plurality of pixel detectors, and adjusting the respective read-out channel deadtime, $\tau_{ASIC}$, based on the determined sensor material deadtime, $\tau_{sensor}$, of the respective one of the plurality of pixel detectors, such that a total deadtime, $\tau_{total}$ of each pixel detector including a sum of the respective sensor material deadtime, $\tau_{sensor}$, and the respective read-out channel deadtime, $\tau_{ASIC}$, varies by less than ±5% from each other.

4 Claims, 15 Drawing Sheets

(56) References Cited

U.S. PATENT DOCUMENTS

| | | | | |
|---|---|---|---|---|
| 2005/0012033 | A1* | 1/2005 | Stern | H04N 25/773 250/214 R |
| 2017/0248704 | A1* | 8/2017 | Nelson | H03K 21/14 |
| 2019/0146098 | A1* | 5/2019 | Roessl | G01T 7/005 250/252.1 |

OTHER PUBLICATIONS

Lai, X. et al., "Image Space Performance Evaluation of a Photon Counting ASIC Using a Multilayer Perception," M-05-153 Mic Poster Session 1, Oct. 21, 2021, IEEE Nuclear Science Symposium and Medical Imaging Conference (Virtual).

Taguchi, K. et al., "An analytical model of the effects of pulse pileup on the energy spectrum recorded by energy resolved photon counting x-ray detectors," Medical Physics, The International Journal of Medical Physics Research and Practice, vol. 37, No. 8, pp. 3957-3969, (2010); https://doi.org/10.1118/1.3429056.

* cited by examiner

1000

1002

Expose a pixelated radiation detector having an initial deadtime calibration of the detector read-out circuitry to ionizing radiation for an exposure period to obtain a set of detection counts from pixel detectors of the radiation detector.

1004

Analyze the set of detection counts to identify a first group of one or more pixel detectors of the radiation detector having a relatively low output count rate (OCR) and a second group of one or more pixel detectors of the radiation detector having a relatively high OCR.

1006

Adjust the deadtime calibration of the detector read-out circuitry to decrease the deadtime $\tau_{ASIC}$ of one or more read-out channels that read-out photon counts of the first group of one or more pixel detectors and increase the deadtime $\tau_{ASIC}$ of one or more read-out channels that read-out photon counts of the second group of one or more pixel detectors.

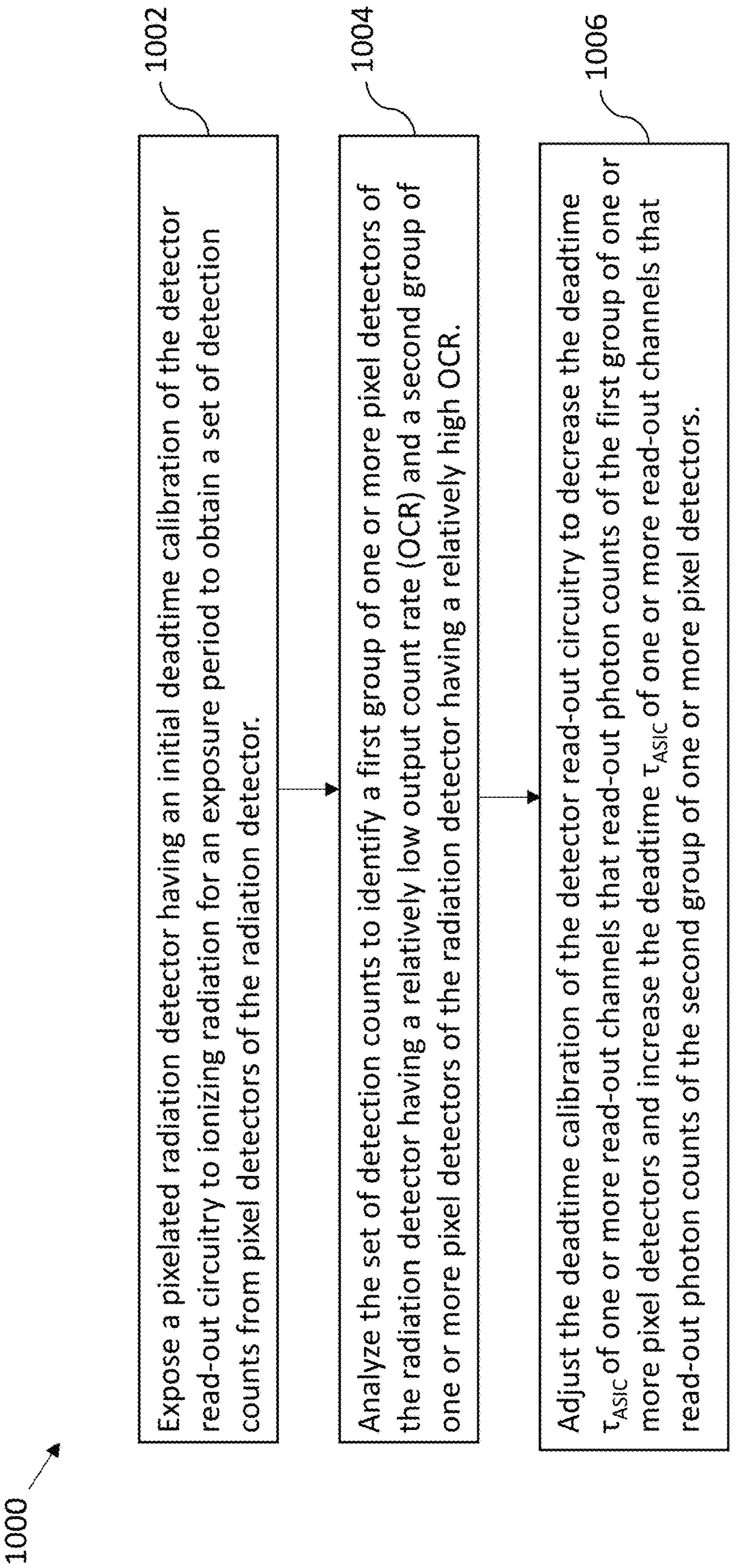

Obtain a baseline set of detection counts from pixel detectors of a pixelated radiation detector.    1102

Modify a deadtime setting of at least one read-out channel of read-out circuitry of the radiation detector based on the set of detection counts    1104

Obtain an updated set of detection counts from pixel detectors of the pixelated radiation detector.    1106

Determine an OCR spread between different pixel detectors of the radiation detector based on the updated set of detection counts.    1008

Does OCR spread meet acceptance criteria?    1110

No

Yes

End    1112

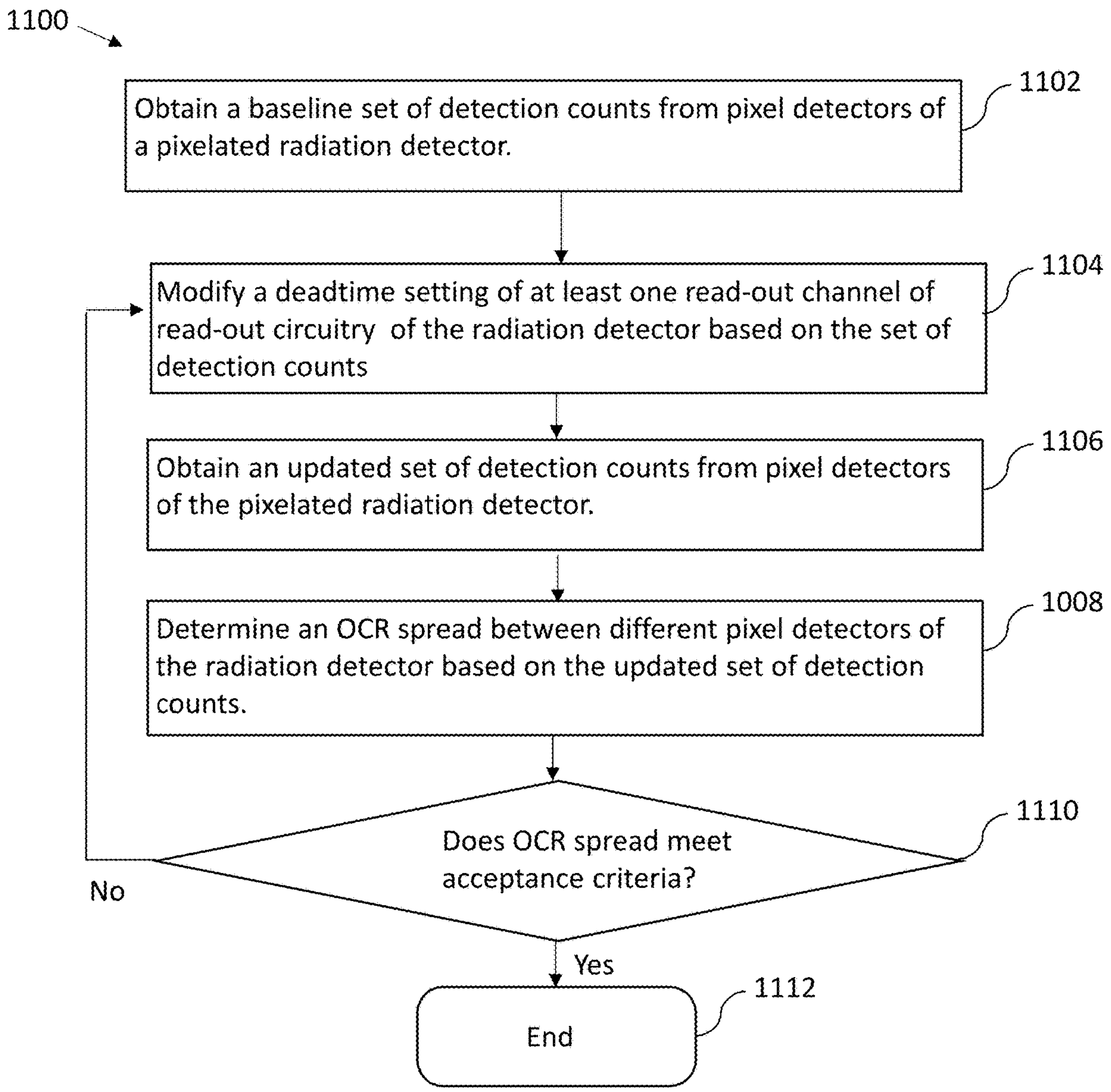

FIG. 11

RADIATION DETECTORS HAVING IMPROVED OUTPUT COUNT RATE EQUALIZATION AND METHODS OF OPERATING THE SAME

FIELD

The present disclosure relates generally to radiation detectors, and more specifically to pixelated radiation detectors including one or more radiation sensors mounted to an application specific integrated circuit that provide improved equalization of output count rate (OCR).

BACKGROUND

Room temperature pixelated radiation detectors made of semiconductors, such as cadmium zinc telluride ($Cd_{1-x}Zn_xTe$ where $0<x<1$, or "CZT"), are gaining popularity for use in medical and non-medical imaging. These applications use the high energy resolution and sensitivity of the radiation detectors.

SUMMARY

According to an aspect of the present disclosure, a method of calibrating a pixelated radiation detector containing a plurality of pixel detectors electrically connected to a plurality of respective read-out channels of detector read-out circuitry includes determining a sensor material deadtime, $\tau_{sensor}$, for each of the plurality of pixel detectors, and adjusting the respective read-out channel deadtime, $\tau_{ASIC}$, based on the determined sensor material deadtime, $\tau_{sensor}$, of the respective one of the plurality of pixel detectors, such that a total deadtime, $\tau_{total}$ of each pixel detector including a sum of the respective sensor material deadtime, $\tau_{sensor}$, and the respective read-out channel deadtime, $\tau_{ASIC}$, varies by less than ±5% from each other.

According to another aspect of the present disclosure, a method of calibrating a pixelated radiation detector includes obtaining a baseline set of detection counts from pixel detectors of the pixelated radiation detector, modifying a deadtime setting of at least one read-out channel of read-out circuitry of the radiation detector based on the set of detection counts, obtaining an updated set of detection counts from the pixel detectors of the pixelated radiation detector, determining an OCR spread between different pixel detectors of the radiation detector based on the updated set of detection counts, determining whether the OCR spread meets an acceptance criterion, modifying the deadtime setting of at least one read-out channel of the read-out circuitry of the radiation detector based on the updated set of detection counts, obtaining an additional updated set of detection counts from the pixel detectors of the pixelated radiation detector, and determining the OCR spread between different pixel detectors of the radiation detector based on the additional updated set of detection counts in response to determining that the OCR spread does not meet the acceptance criterion, and ending the calibration of the pixelated radiation detector in response to determining that the OCR spread does meet the acceptance criterion.

According to yet another aspect of the present disclosure, a pixelated radiation sensor includes a radiation sensor having a semiconductor sensor material, a cathode electrode over a first surface of the semiconductor sensor material, and a plurality of anode electrodes over a second surface of the semiconductor sensor material, where each anode electrode defines a pixel detector. The pixelated radiation sensor further includes an application specific integrated circuit (ASIC) electrically connected to the plurality of anode electrodes and comprising a plurality of read-out channels, each read-out channel electrically connected to a respective one of the plurality of the anode electrodes and configured to read-out photon counts from a respective pixel detector of the radiation sensor, wherein a deadtime, $\tau_{ASIC}$, of at least some of the read-out channels of the ASIC varies by more than ±5% from each other, and total deadtime, $\tau_{total}$ of each pixel detector including a sum of a sensor material deadtime, $\tau_{sensor}$, and the read-out channel deadtime, $\tau_{ASIC}$, varies by less than ±5% from each other.

BRIEF DESCRIPTION OF THE DRAWINGS

FIG. 10 is a process flow diagram of a method for calibrating a pixelated radiation detector to provide improved equalization of the output count rate (OCR) of the detector according to an embodiment of the present disclosure.

FIG. 11 is a process flow diagram of a method of iteratively adjusting the deadtime settings to provide improved equalization of the OCR of the detector according to an embodiment of the present disclosure.

DETAILED DESCRIPTION

Embodiments of the present disclosure generally relate to pixelated radiation detectors including one or more radiation sensors mounted to an application specific integrated circuit (ASIC), and methods of calibrating pixelated radiation detectors to provide improved equalization of output count rate (OCR).

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

Figure 1A:
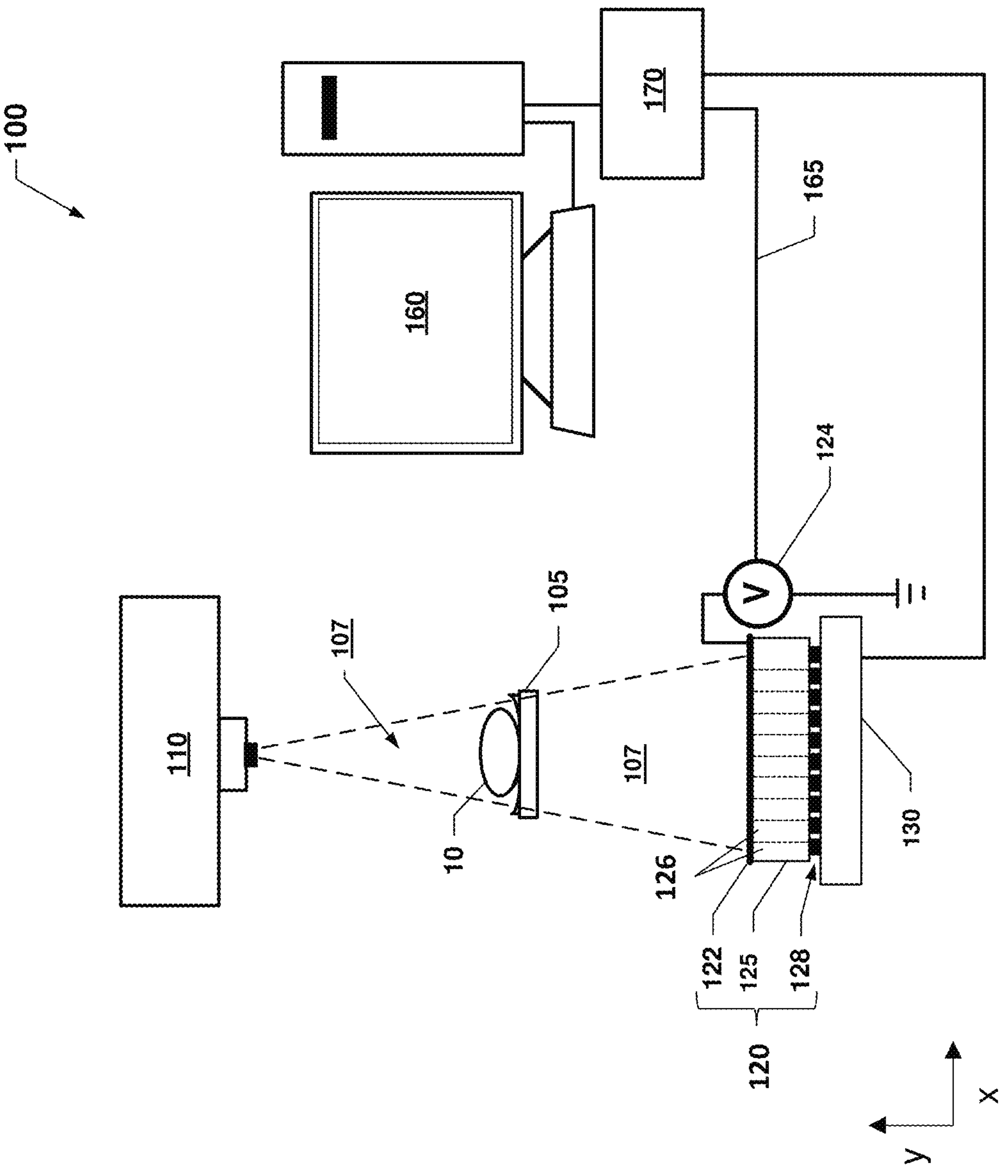
FIG. 1A is a functional block diagram of an X-ray imaging system in accordance with various embodiments of the present disclosure.

FIG. 1A is a functional block diagram of an ionizing radiation imaging system 100 in accordance with various embodiments of the present disclosure. The illustrated ionizing radiation imaging system is an X-ray imaging system 100 that includes an X-ray source 110 (i.e., a source of ionizing radiation), and an energy discriminating photon counting radiation detector 120. The X-ray imaging system 100 may additionally include a patient support structure 105, such as a table or frame, which may rest on the floor and may support an object 10 to be scanned. In some embodiments, the object 10 may be a biologic subject (i.e., a human or animal patient). The support structure 105 may be stationary (i.e., non-moving) or may be configured to move relative to other elements of the X-ray imaging system 100, such as the X-ray source.

The X-ray source 110 is typically mounted to a gantry and may move or remain stationary relative to the object 10. The X-ray source 110 is configured to deliver ionizing radiation to the radiation detector 120 by emitting an X-ray beam 107 toward the object 10 and the radiation detector 120. After the X-ray beam 107 is attenuated by the object 10, the beam of radiation 107 is received by the radiation detector 120.

The radiation detector 120 may be controlled by a high voltage bias power supply 124 that selectively creates an electric field between an anode 128 and cathode 122 pair coupled thereto. In one embodiment, the radiation detector 120 includes a plurality of anodes 128 (e.g., one anode per pixel) and one common cathode 122 electrically connected to the power supply 124 and facing the X-ray source 110. The radiation detector 120 may include a detector material 125, such as a semiconductor material disposed between the anode 128 and cathode 122 and thus configured to be exposed to the electrical field therebetween. The semiconductor material may comprise any suitable semiconductor material for detecting X-ray radiation disposed between the anode 128 and cathode 122 and thus configured to be exposed to the electrical field therebetween. In various embodiments, the semiconductor material of the radiation detector 120 may comprise a II-VI semiconductor material, such as cadmium telluride, cadmium zinc telluride (i.e., CdZnTe or "CZT"), cadmium selenide telluride, and cadmium zinc selenide telluride. Other suitable semiconductor materials are within the contemplated scope of disclosure.

A read-out application specific integrated circuit (ASIC) 130 coupled to the anode(s) 128 may receive signals (e.g., charge or current) from the anode 128(*s*) and be configured to provide data to and by controlled by a control unit 170. The radiation detector 120 may be segmented or configured into a large number of small "pixel" detectors 126. In various embodiments, the pixel detectors 126 of the radiation detector 120 and the ASIC 130 are configured to output data that includes counts of photons detected in each pixel detector in each of a number of energy bins. Thus, radiation detectors 120 of various embodiments provide both two-dimensional detection information regarding where photons were detected, thereby providing image information, and measurements of the energy of the detected X-ray photons. A radiation detector 120 that is capable of measuring the energy of the X-ray photons impinging on the detector 120 may be referred to as an energy-discriminating radiation detector 120.

The control unit 170 may be configured to synchronize the X-ray source 110, the read-out ASIC 130, and the high voltage bias power supply 124. The control unit 170 may be coupled to and operated from a computing device 160. Alternatively, the computing device 160 and the control unit 170 may be integrated together as one device.

In some embodiments, the X-ray imaging system 100 may be a computed tomography (CT) imaging system. The CT imaging system 100 may include a gantry (not shown in FIG. 1A), which may include a moving part, such as a circular, rotating frame with the X-ray source 110 mounted on one side and the radiation detector 120 mounted on the other side. The radiation detector 120 may have a curved shape along its long axis (i.e., the x-axis direction in FIG. 1A) such that each of the pixel detectors along the length of the radiation detector may face towards the focal spot of the X-ray source 110. The gantry may also include a stationary (i.e., non-moving) part, such as a support, legs, mounting frame, etc., which rests on the floor and supports the moving part. The X-ray source 110 may emit a fan-shaped or cone-shaped X-ray beam 107 as the X-ray source 110 and the radiation detector 120 rotate on the moving part of the gantry around the object 10 to be scanned. After the X-ray beam 107 is attenuated by the object 10, the X-ray beam 107 is received by the radiation detector 120. The curved shape of the radiation detector 120 may allow the CT imaging system 100 to create a 360° continuous circular ring of the image of the object 10 by rotating the moving part of the gantry around the object 10.

For each complete rotation of the X-ray source 110 and the radiation detector 120 around the object 10, one cross-sectional slice of the object 10 may be acquired. As the X-ray source 110 and the radiation detector 120 continue to rotate, the radiation detector 120 may take numerous snapshots called "views". Typically, about 1,000 profiles are taken in one rotation of the X-ray source 110 and the radiation detector 120. The X-ray source 110 and the detector 120 may slowly move relative to the patient along a horizontal direction (i.e., into and out of the page in FIG. 1A) so that the detector 120 may capture incremental cross-sectional profiles over a region of interest (ROI) of the object 10, which may include the entire object 10. The data acquired by the radiation detector 120 and output by the read-out ASIC 130 may be passed along to the computing device 160 that may be located remotely from the radiation detector 120 via a connection 165. The connection 165 may be any type of wired or wireless connection. If the connection 165 is a wired connection, the connection 165 may include a slip ring electrical connection between any structure (e.g., gantry) supporting the radiation detector 120 and a stationary support part of the support structure, which supports any part (e.g., a rotating ring). If the connection 165 is a wireless connection, the radiation detector 120 may contain any suitable wireless transceiver to communicate data with another wireless transceiver that is in communication with the computing device 160. The computing device 160 may include processing and imaging applications that analyze each profile obtained by the radiation detector 120, and a full set of profiles may be compiled to form a three-dimensional computed tomographic (CT) reconstruction of the object 10 and/or two-dimensional images of cross-sectional slices of the object 10.

Various alternatives to the design of the X-ray imaging system 100 of FIG. 1A may be employed to practice embodiments of the present disclosure. X-ray imaging systems may be designed in various architectures and configurations. For example, an X-ray imaging system may have a helical architecture. In a helical X-ray imaging scanner, the X-ray source 110 and radiation detector 120 are attached to a freely rotating gantry. During a scan, a table moves the object 10 smoothly through the scanner, or alternatively, the X-ray source 110 and detector 120 may move along the length of the object 10, creating helical path traced out by the X-ray beam. Slip rings may be used to transfer power and/or data on and off the rotating gantry. In other embodiments, the X-ray imaging system may be a tomosynthesis X-ray imaging system. In a tomosynthesis X-ray scanner, the gantry may move in a limited rotation angle (e.g., between 15 degrees and 60 degrees) in order to detect a cross-sectional slice of the object 10. The tomosynthesis X-ray scanner may be able to acquire slices at different depths and with different thicknesses that may be reconstructed via image processing.

Figure 1B:
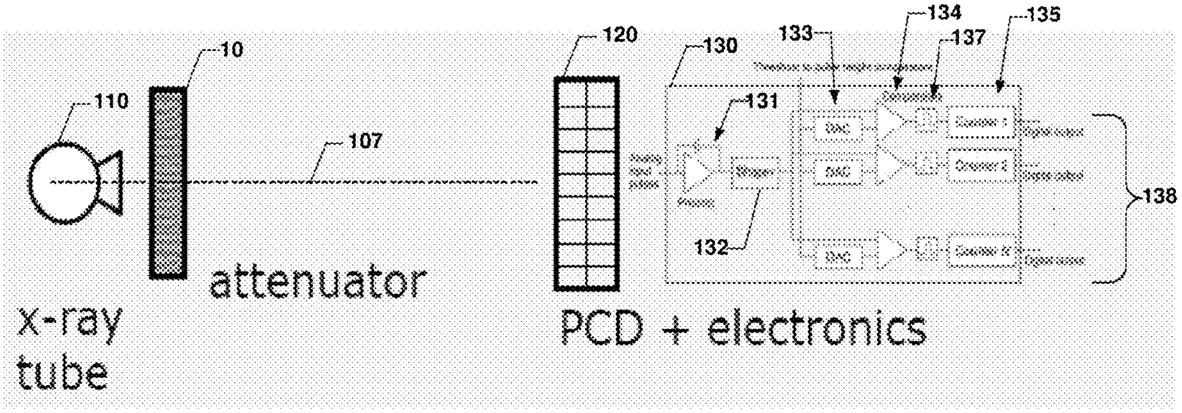
FIG. 1B is a schematically illustration of an application specific integrated circuit (ASIC) configured to count X-ray photons detected in each pixel detector within a set of energy bins according to various embodiments of the present disclosure.

FIG. 1B illustrates components of an X-ray imaging system, including components within the ASIC 130 configured to count X-ray photons detected in each pixel detector within a set of energy bins. As used herein, the terms "energy bin" and "bin" refer to a particular range of measured photon energies between a minimum energy threshold and a maximum energy threshold. For example, a first bin may refer to counts of photons determined to have an energy greater than a threshold energy (referred to as a trigger threshold, e.g., 20 keV) and less than 40 keV, while a second bin may refer to counts of photons determined to have an energy greater than 40 keV and less than 60 keV, and so forth.

X-rays 107 from an X-ray source (e.g., X-ray tube) 110 may be attenuated by a target (e.g., an object 10, such as a human or animal patient) before interacting with the radiation detector material within the pixelated detector array 120. An X-ray photon interacting (e.g., via the photoelectric effect) with a pixelated radiation detector material generates an electron cloud within the material that is swept by an electric field to the anode electrode 128. The charge gathered on the anode creates a signal that is integrated by a charge sensitive amplifier (CSA) 131. There may be a CSA 131 for each pixel detector (e.g., for each anode 128) within the pixelated X-ray detector 120. The voltage of the CSA output signal may be proportional to the energy of the X-ray photon. The output signal of the CSA may be processed by an analog filter or shaper 132.

The filtered output may be connected to the inputs of a number of analog comparators 134, with each comparator connected to a digital-to-analog converter (DAC) 133 that inputs to the comparator a DAC output voltage that corresponds to the threshold level defining the limits of an energy bin. The detector circuitry 130 may be configured so that after the CSA voltage has stabilized (after the dead time), that voltage may be between two voltage thresholds set by two DACs 133, which determines the output of the comparators 134. Outputs from the comparators 134 may be processed through decision gates 137, with a positive output from a comparator 134 corresponding to a particular energy bin (defined by the DAC output voltages) resulting in a count added to an associated counter 135 for the particular energy bin. Periodically, the counts in each energy bin counter 135 are output as signals 138 to the control unit 170.

The detector array of an X-ray imaging system may include an array of radiation detector elements, referred to herein as pixel detectors. The signals from the pixel detectors may be processed by a pixel detector circuit, which may sort detected photons into energy bins based on the energy of each photon or the voltage generated by the received photon. When an X-ray photon is detected, its energy is determined and the X-ray photon count for its associated energy bin is incremented. For example, if the detected energy of an X-ray photon is 24 kilo-electron-volts (keV), the X-ray photon count for the energy bin of 20-40 keV may be incremented. The number of energy bins may be three or more, such as four to twelve. In an illustrative example, an X-ray photon counting detector may have four energy bins: a first bin for detecting photons having an energy between 20 keV and 40 keV, a second bin for detecting photons having an energy between 40 keV and 60 keV, a third bin for detecting photons having an energy between 60 keV and 90 keV, and a fourth bin for detecting photons having an energy above 90 keV (e.g., between 90 keV and 120 keV). The greater the total number of energy bins, the better the material discrimination. The total number of energy bins and the energy range of each bin may be selectable by a user, such as by adjusting the threshold levels defining the limits of the respective energy bins in the read-out ASIC 130 as shown in FIG. 1B.

In various embodiments, a radiation detector 120 for an X-ray imaging system 100 as described above may include a detector array including a plurality of pixel detectors 126 extending over a continuous two-dimensional (2D) detector array surface. The detector array (which is also known as a detector module system (DMS)) may include a modular configuration including a plurality of detector modules, where each detector module may include at least one radiation sensor (e.g., a detector material 125 including cathode and anode electrode(s) 122, 128 defining pixel detectors 126 as described above), at least one ASIC 130 (also known as a read-out integrated circuit (ROIC)) electrically coupled to the at least one radiation sensor, and a module circuit board. The module circuit board may support transmission of electrical power, control signals, and data signals between the module circuit board and the at least one ASIC 130 and the at least one radiation sensor of the detector module, and may further support transmission of electrical power, control signals, and data signals between the module circuit board and the control unit 170 of the X-ray imaging system 100, other module circuit boards of the detector array, and/or a power supply for the detector array. A plurality of detector modules may be assembled on a common support structure, such as a detector array frame, to form a detector array.

It should be noted that various embodiments of imaging radiation detectors and methods of processing signals from such detectors, may be used in other types of ionizing radiation imaging systems, such as Single Photon Emission Computed Tomography (SPECT) imaging systems, stationary X-ray imaging systems, non-destructive testing and inspection imaging systems, etc.

Figure 2:
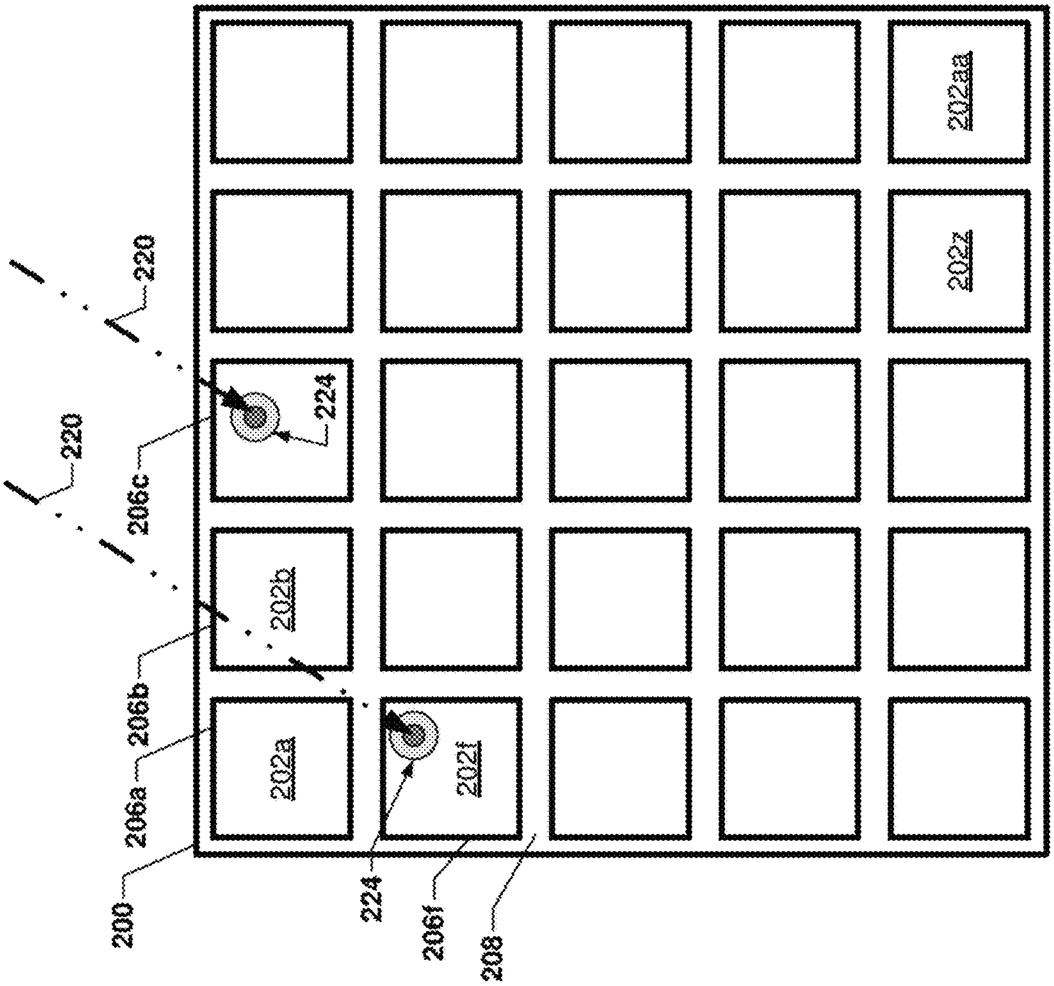
FIG. 2 is a top view of a portion of a pixelated radiation detector array showing a plurality of pixel detectors formed by the anodes positioned on a CZT semiconductor crystal according to various embodiments of the present disclosure.

FIG. 2 is a top view of a portion of a pixelated radiation detector array 200 showing the plurality of pixel detectors 202*a*-202*aa* formed by the anodes 206*a*, 206*b*, 206*c*, . . . 206*f*, . . . etc., positioned on the CZT semiconductor crystal 208. As described above, when an X-ray 220 interacts with atoms within the CZT semiconductor crystal 208, the cloud of ejected electrons 224 are gathered on the nearby anode 206*c*, 206*f* and recorded as a count. Further, the number of electrons 224 (i.e., charge) collected on the anode 206*c*, 206*f* is reflective of the energy of the incoming photon, and thus a measurement of the energy (or spectrum) of the detected photon can be determined from the charge or current detected on the anodes.

Figure 3A:
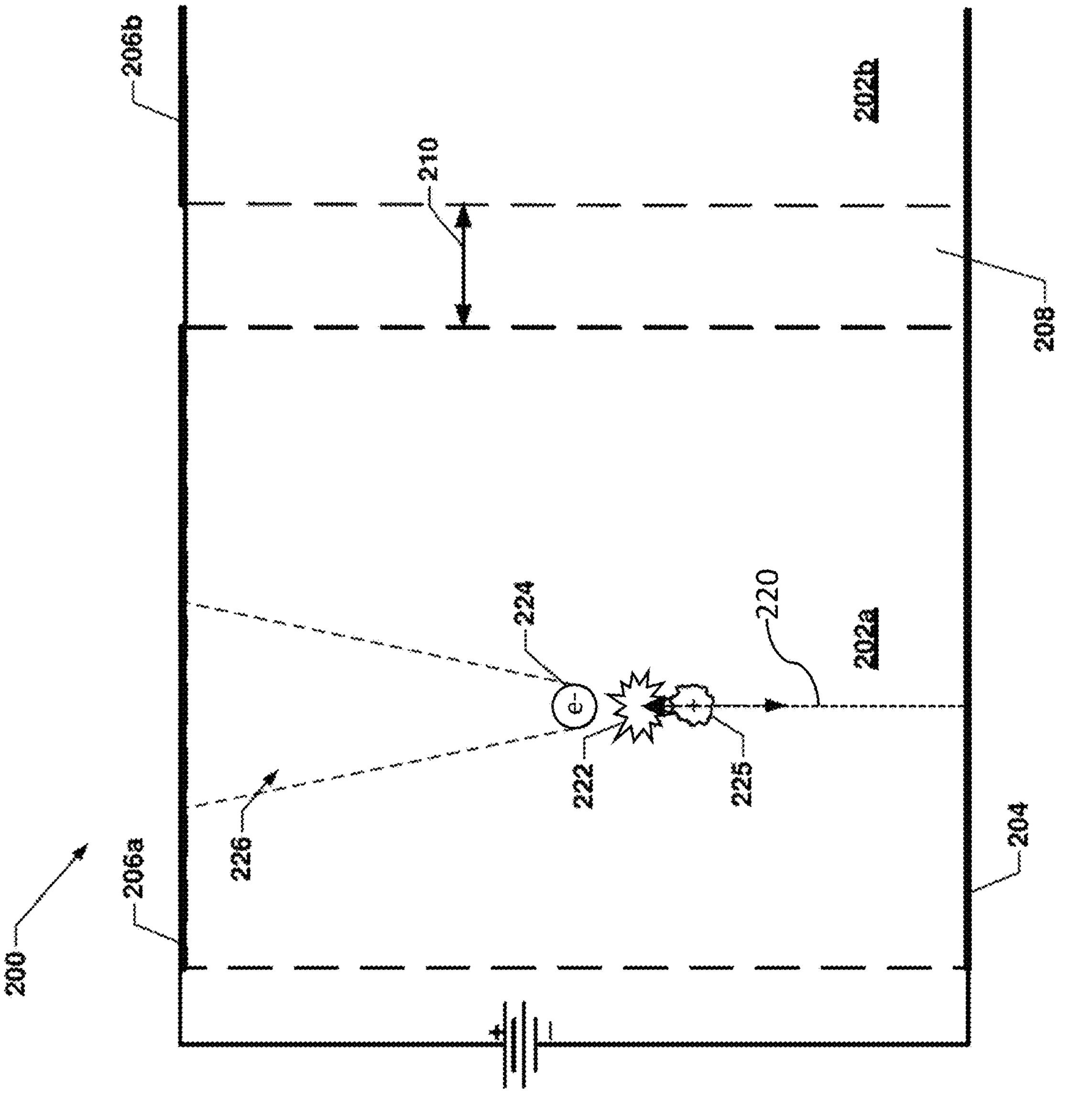
FIG. 3A illustrates a cross-sectional view of two pixel detectors within a CZT radiation detector array according to various embodiments of the present disclosure.

As an X-ray photon enters the CZT sensor volume of a detector and interacts with the atoms constituting that sensor it will deposit some or all of its energy. FIG. 3A illustrates a cross-sectional view of two pixel detectors 202*a*, 202*b* within a CZT radiation detector array 200. Such a detector 200 may include a sheet of CZT semiconductor crystal 208 located between a cathode 204 (e.g., cathode 122 shown in FIG. 1A) and the anodes 206*a*, 206*b* (e.g., anodes 128 shown in FIG. 1A) that define each pixel 202*a*, 202*b* (e.g., pixels 126 shown in FIG. 1A). The anodes 206*a*, 206*b* may be spaced apart by an inter-pixel gap 210. In typical radiation detector arrays 200, the thickness of the CZT semiconductor crystal 208 may range from 1 mm to 20 mm, the anodes 206*a*, 206*b* may have a side dimension of 0.1 mm to 3 mm, and the inter-pixel gap 210 may range from 0.01 mm to 0.5 mm.

When an X-ray 220 is absorbed via a photoelectric effect event 222 by an electron of an atom within the CZT semiconductor crystal 208, the energy of the X-ray photon is transferred to an ejected electron (not shown) that quickly slows down by ionizing nearby atoms thus generating a cloud of electrons 224 ejected into the conduction band of the semiconductor along the path of travel. The range of a photoelectron in CZT depends on the energy carried off by that electron. Each ejected electron creates a corresponding hole 225 of positive charge. The clouds of electrons (and holes) generated by a photoelectron are not uniform in charge density, because electron-hole production increases towards the end of the track of the photoelectron. A voltage is applied between the cathode 224 and anodes 206*a*, 206*b* causes the electrons 224 to drift to the anode 206*a* where they are collected as a signal as described above. Holes 225 similarly migrate towards the cathode 204. Diffusion and charge repulsion forces cause the electron charge cloud 226 to expand by the time the electrons reached the anode 206*a*.

The term "cloud" is used to highlight the fact that the physical size of the electron charge is not a point but approximately a sphere with a certain radius. Each X-ray photon absorbed in the CZT detector generates several thousands of electrons, so even the initial charge has finite physical dimensions. The number of generated electrons can be estimated by dividing the incoming photon energy by the CZT ionization energy of 4.64 eV. For example, an X ray photon with an energy of 140 keV will produce about 30,000 electrons in the conduction zone, collectively carrying a charge of approximately 4.8 femto coulombs (fC).

In photon counting computed tomography, like in any high-count X-ray detector system, to accurately differentiate between two photon detection events, a minimum time separating those events is needed. This minimum separation time is referred to as the deadtime "r" of the system. As the detector needs to accommodate the time required for the charge cloud 226 to migrate to the anode 206*a* before recording the gathered charge into a count, the pixel detector circuitry (e.g., an above-described ASIC 130) is typically configured with a deadtime timer that it is triggered when a charge signal on the anode is first detected and controls when the charge on the anode should be registered as a signal indicative of the energy of the detected photon. In a typical detector, a threshold circuit coupled to each anode 206 may start such a timer when the charge on the anode exceeds a certain minimum threshold. The deadtime T provides sufficient time for the electron cloud produced by the photon interaction to move to the anode and for the read-out electronics to measure the induced charge and the reset to detect the next photon interaction. The deadtime in X-ray imaging detectors is brief, on the order of a few tens of nanoseconds (e.g., 10-50 ns, such as between 10-25 ns). Without providing this deadtime before recording a detection signal, the measured charge on the anode would not reflect the full charge in the cloud of electrons generated by absorption of the photon, and as a result the full energy of the incident photon may not be determined. This is particularly true for the photons that interact with the detector material far from the anode.

While the deadtime is necessary to obtain an accurate measure of detected photon energies, the deadtime provides an interval during which two photons can be absorbed by the detector, resulting in a pileup event. The rate at which pileup events occur in any pixel detector is approximately equal to the rate of X-ray photons absorbed by the detector (i.e., the input count rate) times the deadtime. Since the deadtime is very brief, such as 60 ns or less, there are very few pileup events when the X-ray flux is low. However, in a high X-ray flux application, there is a significant probability that a second (or third) photon will be absorbed in the detector pixel during the deadtime, resulting in a pileup detection event. This can be a significant problem in any of a number of X-ray imaging systems, such as a CT scanner, where the incoming photon flux rate may be on the order of 0.1-1,000 million counts per second per square millimeter of the detector (Mcps/$mm^2$).

Figure 3B:
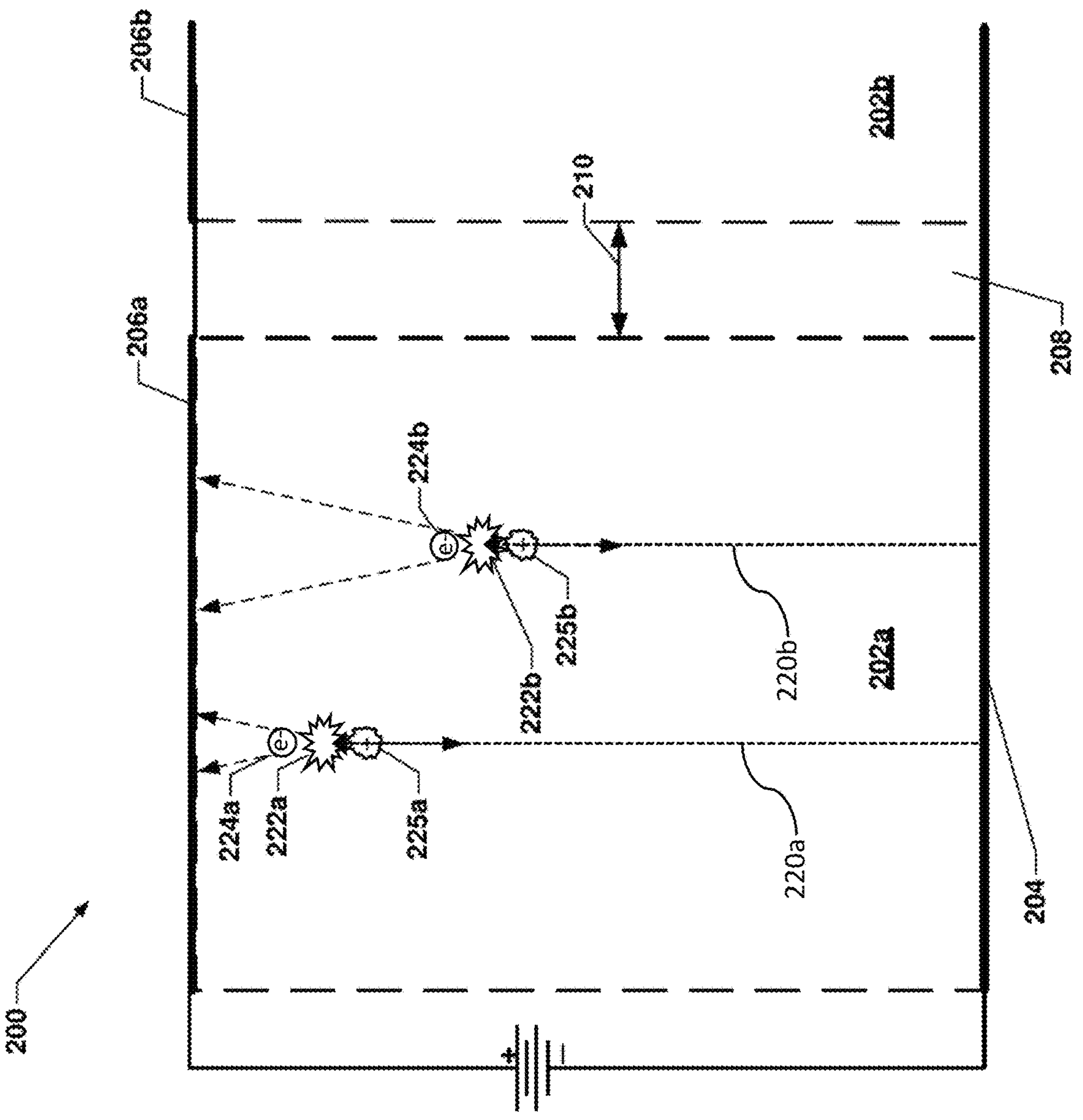
FIG. 3B illustrates a cross-sectional view of the radiation detector array of FIG. 3A illustrating an example of a pileup detection event according to various embodiments of the present disclosure.

An example of a pileup detection event is illustrated in FIG. 3B. In this example, a first X-ray photon 220*a* is absorbed in a first photoelectric event 222*a*, resulting in a first electron cloud 224*a* that migrates toward the anode 206*a* and a first hole cloud 225*a* that migrates toward the cathode 204. Before the end of the deadtime, a second X-ray photon 220*b* is absorbed in a second photoelectric event 222*b*, resulting in a second electron cloud 224*b* that migrates toward the anode 206*a* and a second hole cloud 225*a* that migrates toward the cathode 204. Thus, by the end of the deadtime, the total charge accumulated by the pixel anode 206*a* will be that of the first electron cloud 224*a* and at least a portion of the second electron cloud 224*b*, resulting in a greater charge read by the CSA 131 of the ASIC 130, and thus a higher energy output signal by the CSA 131 than the energy of either incoming photons 220*a*, 220*b*. Thus, if treated as a single detection event, the resulting detection will be of one photon count instead of two with an energy measurement (i.e., charge accumulated on the anode) greater than that of either incident photon.

One way to detect pileup conditions is to measure output count rate-input count rate characteristics. When the X-ray flux is relatively low while operating the X-ray tube at low current levels, the relationship between the input count rate, controlled by the X-ray tube current, and the output count rate is effectively linear. This is because at a low X-ray flux, the probability of pileup events occurring in any one pixel detector is relatively low. Said another way, the rate of pileup events is low, and therefore the number of lost counts is also low. At medium X-ray current levels, the curve of the output count rate versus X-ray tube current level starts to deviate from linearity as the increase in X-ray flux increases the rate of pileup events, and thus the rate of lost counts, in pixel detectors. At high X-ray tube currents, when the X-ray flux is high, the current of output count rate versus X-ray tube current can saturate as pileup events begin to dominate photon detections within the pixel detectors.

Radiation detectors can be characterized by their response to pileup events depending upon the trigger mechanism for the detection circuitry (also referred to as read-out electronics). The behavior of a detector system in a pileup event (i.e., when one or multiple photon absorption events occur in a pixel detector within the deadtime T triggered by a previous absorption event) is dictated by the architecture of the system and can depend on the physical processes in the sensor, or delays in the pulse processing chain or readout electronics.

In one type of X-ray detector (i.e., detector materials and detection circuitry), the deadtime triggered by detection of a charge on the anode from a first photon absorption runs for a fixed period of time (i.e., the deadtime), regardless of whether additional photons are absorbed in the pixel detector during that deadtime. Such detectors are less sensitive to saturation due to pileup effects because the detector is available to detect photons at the end of the fixed deadtime. Such detectors are said to exhibit "non-paralyzable behavior" because the detector is not paralyzed by pileup effects at very high X-ray flux levels.

In another type of X-ray detector (i.e., detector materials and detection circuitry), the deadtime is triggered by each detection of a charge on the anode regardless of when each photon is detected. Such detectors are sensitive to saturation due to pileup effects because the deadtime during which counts are lost may be extended by subsequent photon detections. Such detectors are said to exhibit "paralyzable behavior."

Figure 4:
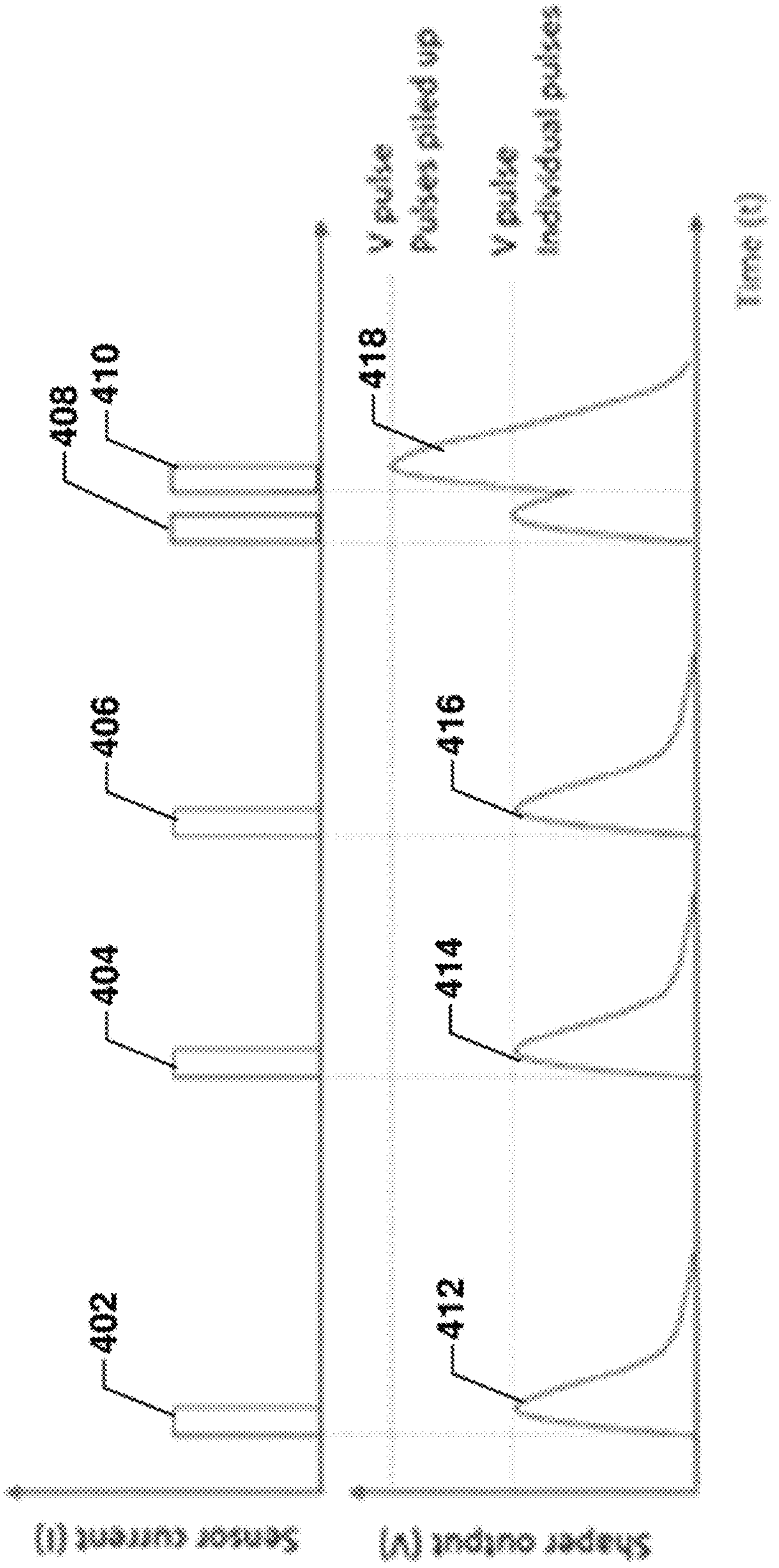
FIG. 4 is a graph contrasting non-pileup detection events from a pileup detection event and the resulting effect on the measured pulse according to various embodiments of the present disclosure.

Two closely related phenomena are usually considered during these conditions: pileup and count loss. Pileup usually refers to when the pulse being induced on the readout electronics from one event temporally interacts with the pulse from another event. This is illustrated in FIG. 4, where the top graph illustrates the electron cloud generated by photons interacting with the anode (i.e., the photon absorption events), and the bottom graph shows the corresponding voltage output signal observed for these events at the output of the read-out electronics (e.g., a "shaper" circuit 132 of the ASIC 130). FIG. 4 illustrates how the timing of photon absorption events 402-410 can affect the voltage pulse output 412-420 by the shaper circuit 132. So long as the photon absorption events 402, 404, 406 are separated in time by more than the deadtime, the voltage output signal 412, 414, 416 associated with each absorption event can be distinguished by the read-out electronics, as illustrated in the first three photon absorption events shown in FIG. 4. However, when two or more photon absorption events 408, 410 occur within the deadtime and thus temporally interact, the detector circuitry cannot distinguish the two events (i.e., a pileup event occurs) resulting in a convolution of the two voltage signals into a single combined voltage output signal 418.

FIG. 4 illustrates that a pileup event results in two effects. First, the two voltage signals are counted as one photon detection (i.e., count), thus resulting in one count loss. Second, the combined voltage signal 418 that is detected is incorrectly determined to be greater (i.e., associated with a higher energy photon) than it should be for either one of the two overlapping photon absorption events 408, 410, thus resulting in an error in the determined photon energy. For non-energy discriminating detectors, this second effect would not be an issue, only the first effect of a count loss would. However, for an energy discriminating detector, such as the used for spectral photon counting for computed tomography (PCCT), the second effect would lead to a distorted measured spectral response.

The pileup effect shown in FIG. 4 is a traditional analogue electronic illustration of this effect, where the time constant of the shaper circuit often sets the limitation for pileup onset (pileup resolution time) and dictates the maximum count rates allowable before spectral distortion occurs. However, if a peak hold circuit following on from the shaper is used to hold the peak value for read out, for example, and a second event occurs before the peak hold value has been read out, the highest peak height pulse would eventually be read out. This can lead to both a loss in count and a distorted spectral response, as described above, without the pulses necessarily being temporally overlapping. Depending on the particular implementation of the readout electronics modeling of the pileup effects can be quite different.

When discussing deadtime count loss in detector systems, two idealized behaviors are usually referenced—detector systems that become paralyzing or saturated at high X-ray flux, and detector systems that are not non-paralyzed at high X-ray flux. The two types of X-ray detection systems may be characterized by a paralyzable model and a non-paralyzable model that sets out to correlate the deadtime $\tau$, the true count T (i.e., the number of photons absorbed in the detector per unit time), and measured counts M (i.e., the number of counts output by the readout electronics per unit time) for a detector system. The true count T may also be expressed as the input count rate (ICR) of the detector, and the measured counts M may also be expressed as the output count rate (OCR) of the detector. The paralyzable and non-paralyzable models both relate the three-primary metrics of deadtime $\tau$, true count T, and measured counts M to each other. The difference between the true count T and measured count M is the count loss. The main difference between the non-paralyzable and the paralyzable model is in how the detector system reacts when a second event occurs within the deadtime of the first event. The response of systems adhering to both these models to the same incoming count rate scenario is illustrated in FIG. 5.

Figure 5:
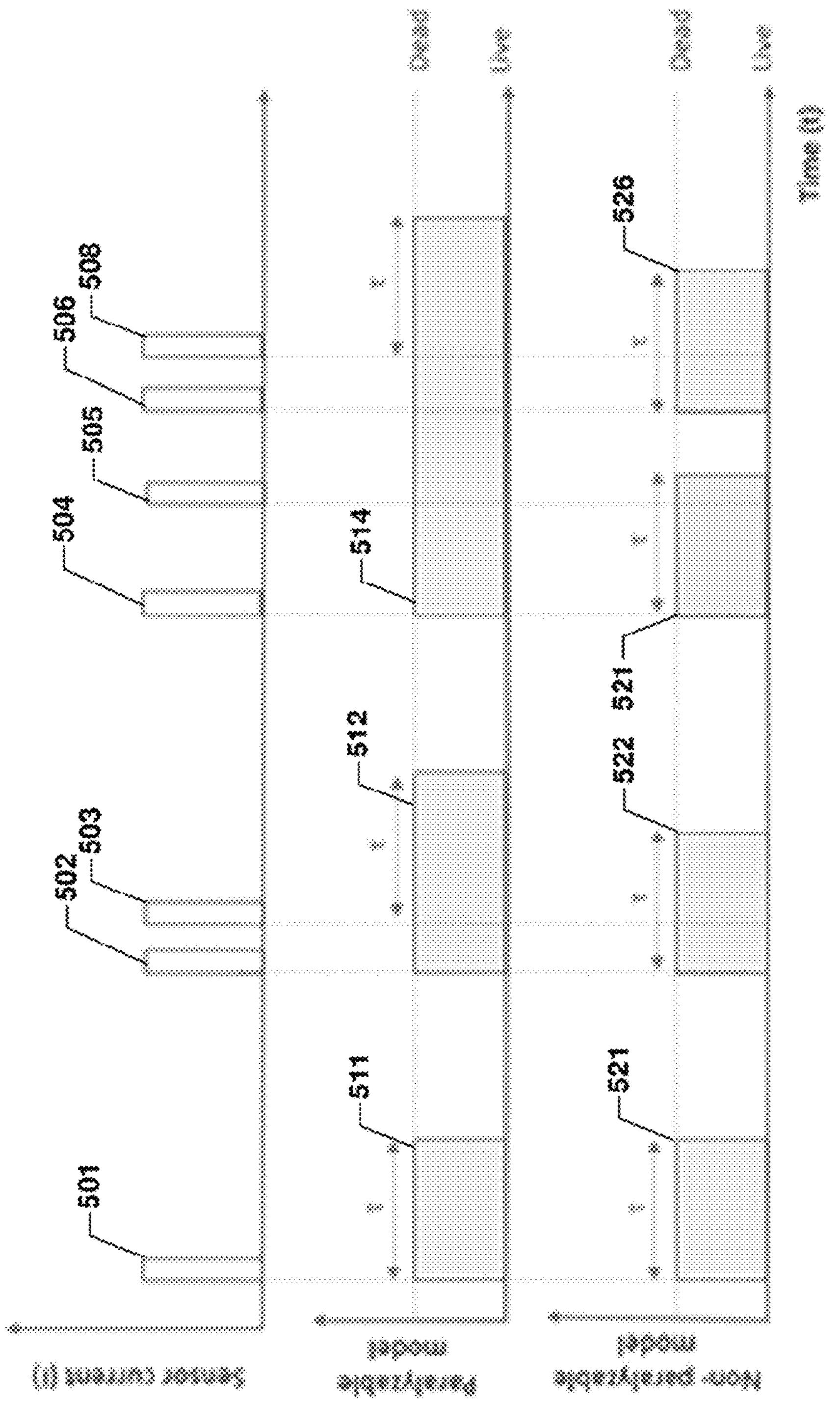
FIG. 5 is a graph illustrating the effects of pileup detection events for X-ray detectors that are "paralyzable" and X-ray detectors that are "non-paralyzable."

FIG. 5 illustrates the response of an X-ray detector that exhibits paralyzable behavior (middle graph) and the response of an X-ray detector that exhibits non-paralyzable behavior (bottom graph) to the same incoming photon detection event sequence (top graph). As shown in FIG. 5, at low count rates, illustrated by photon detection event 501, both types of detector systems accurately determine the count rate because pileup events are rare.

However, as count rates increase, and thus the average interval between two photon detection events decreases, the behaviors of the two types of X-ray detectors begin to differ. For example, in response to a single pileup event in which two photon absorption events 502, 503 occur within the deadtime, the deadtime 512 of the detector triggered by the first photon absorption event 502 is extended by detection of the second photon absorption event 503. Thus, the detector system would remain non-responsive to subsequent photon absorption events until the deadtime has elapsed from the time when the second photon absorption event was registered. In contrast, the detector exhibiting non-paralyzable behavior has a fixed duration deadtime 521 triggered by the first photon absorption event 502. Both types of detectors failed to recognize the second photon absorption event 503, and thus have a count loss equal to 1. However, the detector exhibiting non-paralyzable behavior will be responsive to subsequent photon absorption events as soon as the deadtime has elapsed from the time when the first photon absorption event 502 was registered.

The behaviors of these two types of detector systems diverge as the rate of pileup events increases with increasing X-ray flux. This is illustrated by the responses of the two types of detector systems to multiple photon absorption events occurring close together in sequence as illustrated in photon absorption events 504-508. Once the X-ray flux, and thus the photon absorption rate, is high enough, the detector exhibiting paralyzable behavior will consistently have photon absorption events happening within the deadtime following a previous photon absorption event, and the detector system would exhibit an extended nonresponsive deadtime 514. Thus, in the illustrated example, four photon absorption events 504-508 would register as a single count 514, resulting in a count loss of three. At a high enough rate of photon absorption events, a detector exhibiting paralyzable behavior might never come out of a non-responsive mode, i.e. the non-responsive period 514 could be indefinite, resulting in a measured count of 1 regardless of the number of photon absorption events.

In contrast, a detector exhibiting non-paralyzable behavior would lose a count for a photon absorption event 505 occurring during the deadtime 521 triggered by a first photon absorption event 504, but would then become responsive to a subsequent photon absorption event 506 resulting in a count and another deadtime 526, although it would lose a count for another photon absorption event 508 during that second deadtime. As can be seen from this illustration, the count rate measured by a detector exhibiting non-paralyzable behavior under extremely high X-ray flux conditions would be given by the time that counts are measured (e.g., an exposure time) divided by the length of the fixed deadtime.

It should be noted that the non-paralyzable and paralyzable models are idealized behaviors, and any real detector system, like a CZT readout detector module, may have a response behavior that falls somewhere between these two extremes as dictated by the response of the detector system architecture and readout electronics implementation.

For a detector system exhibiting non-paralyzable behavior, the amount of time the detector system is non-responsive is a set value, as illustrated in FIG. 5, and the total amount of non-responsive time in any measured interval is set by the measured number of counts and the deadtime, i.e. $M\times\tau$. As such, the rate of count loss is given by $T\times M\times\tau$. Considering that the rate of count loss also can be written as $T-M$, this yields the equation $T-M=T\times M\times\tau$. Solving this equation for the measured count rate, M (i.e., the output count rate (OCR) of the detector) yields the following non-paralyzable model equation:

$$M = T/(1 + T\times\tau) \quad \text{[Eq1]}$$

As can be seen in FIG. 5, the non-responsive period for a detector exhibiting paralyzable behavior is not always a set value. However, it can be shown that the distribution of intervals between random events occurring at an average rate is given by the following equation:

$$P(\Delta t)d\Delta t = T\times e^{\wedge}(T\times\Delta t)d\Delta t \quad \text{[Eq2]}$$

where the left-hand term is the probability of observing an interval within dΔt of Δt. Since any two events occurring within a deadtime of each other in a detector exhibiting paralyzable behavior would end up with a non-responsive period exceeding the minimum deadtime τ, integrating the above expression from T to ∞, and multiplying for the true count rate T, yields the following paralyzable model equation:

$$M = T\times e^{\wedge}(-T\times\tau) \quad \text{[Eq3]}$$

Figure 6:
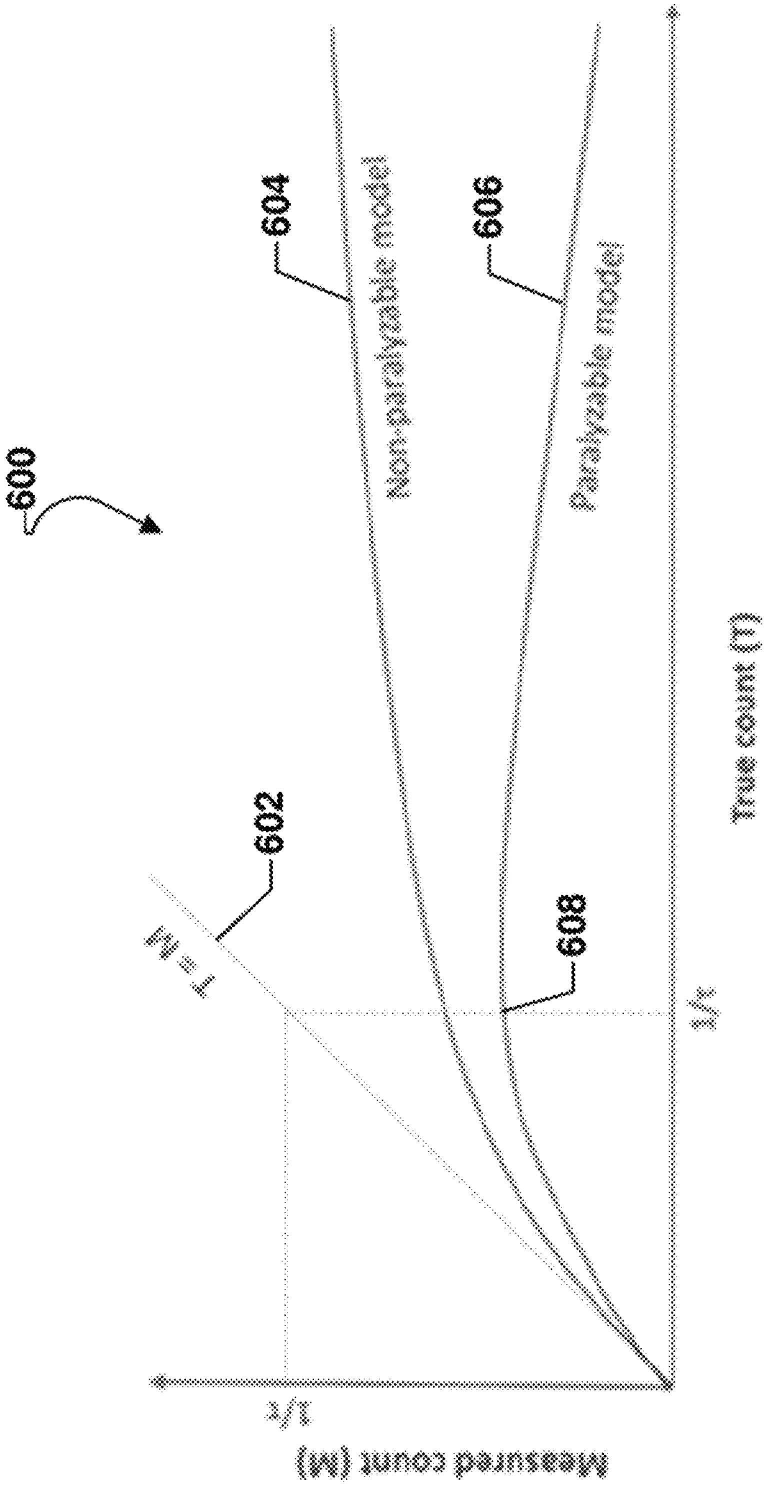
FIG. 6 is a graph showing an example of the effects of pileup events on measured count rates for paralyzable detectors and non-paralyzable detectors as a function of the true count rate (i.e., X-ray flux).

The variation in true count vs. the measured count for an ideal detector (i.e., a detector in which the measured count equals the true count or T=M), a detector following the non-paralyzing model, and a detector following the paralyzing model is illustrated in the graph shown in FIG. 6.

As shown in FIG. 6, at very low photon absorption rates the three models line up. As the photon absorption rate increases, however, the probability of two photon absorption events occurring in a pixel detector within the deadtime increases, and the non-paralyzing or paralyzing natures of the two types of detector system become significant and influence the measured counts. For a detector exhibiting paralyzable behavior, operating at rates exceeding the peak measured count (i.e., $T\sim1/\tau$) introduces an ambiguity in trying to determine the true count, since any one measured count M could correspond to two values of true count T, which can be hard to differentiate. Additionally, operating under conditions in which the count loss exceeds 30-40% is not advisable because small measured count variations would correspond to large variations in true count. As such, any error in the measurement will result in a large error in the accuracy of the estimated true count.

At a sufficiently high photon flux, such as utilized in photon-counting computed tomography (PCCT) imaging application, pile-up effects become unavoidable. However, the impact of pile-up effects may be manageable through various corrections and calibrations. For example, methods for correcting the output from pixel detectors within a pixelated detector of an imaging X-ray system that include determining a pileup correction factor based on count measurements obtained at two different X-ray tube current levels, and applying the pileup correction factor to pixel detector count measurements obtained while imaging an object to obtain pixel detector counts corrected for pileup effects are described in U.S. Pat. No. 11,344,266 to Iniewski et al., the entire content of which is incorporated by reference herein for all purposes.

Another important characteristic of direct detection photon-counting pixelated detectors is the uniformity of photon counts across the different pixels of the detector. In an ideal detector, all pixels should have exactly the same count measurement for a uniform input photon flux. However, in practice, this is not possible due to manufacturing variability and other factors. In general, pixel count non-uniformities up to about ±10% may be acceptable, but the lower the amount of pixel count non-uniformity the better.

Figure 7:
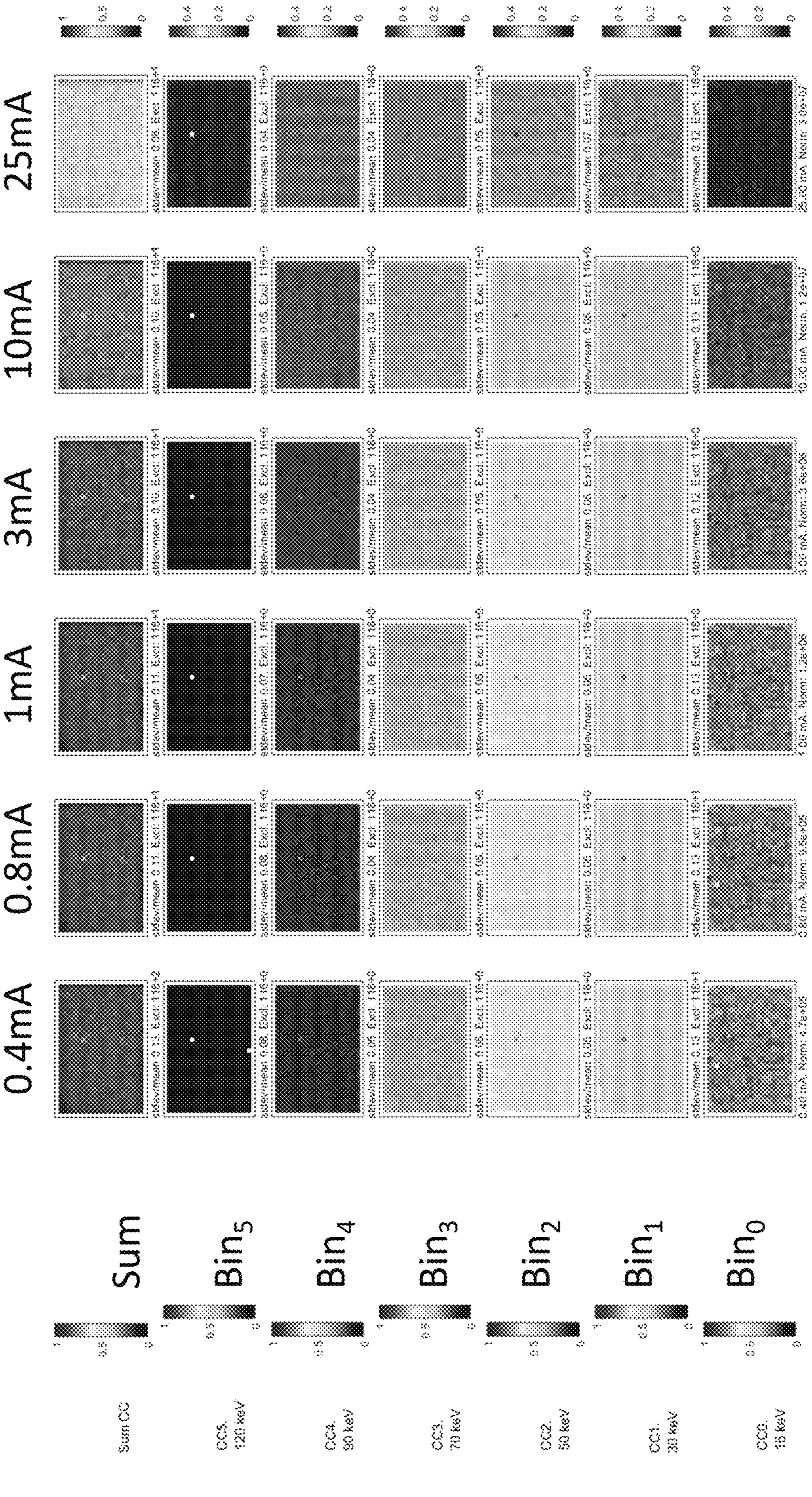
FIG. 7 is a visual heat map representation showing count data for different pixels of a radiation detector measured at different X-ray tube currents and within different energy bins according to various embodiments of the present disclosure.

One method for measuring pixel count uniformity for CT scanner detectors is to measure the photon counts of each pixel of the detector at different X-ray tube current settings that represent the typical flux range used by the CT scanner. For PCCT systems, the counts may be measured in each energy bin of the system. The count data for each pixel may be visually represented in the form of a "heat map" such as shown in FIG. 7, which depicts different measured count values of each pixel as different colors for X-ray tube currents of 0.4 mA, 0.8 mA, 1 mA, 3 mA, 10 mA and 25 mA within six different energy bins: $Bin_0$ (16-30 keV), $Bin_1$ (30-50 keV), $Bin_2$ (50-70 keV), $Bin_3$ (70-90 keV, $Bin_4$ (90-120 keV), and $Bin_5$ (>120 keV). The top row in FIG. 7 illustrates the total measured counts (across all energy bins) for each pixel at the different tube current settings. For an ideal detector, every pixel would have the same color for each tube current and energy bin. As shown in FIG. 7, however, there is a degree of variation in the measured photon counts across individual pixels of the detector.

In addition, the pixel-to-pixel count non-uniformities across the detector are different at lower tube current values (where the output count rate (OCR) and the input count rate (ICR) have a linear relationship) than at higher tube current values (where the OCR-ICR relationship is non-linear or saturated). At lower tube currents, the pixel-to-pixel count non-uniformities are driven primarily by physical differences between the detector pixels. Such differences may include localized material imperfections in the detector semiconductor crystal (e.g., tellurium inclusions in CZT), anode contact non-uniformities, non-uniformities in the design and/or placement of an anti-scatter grid (ASG), imperfect or lack of passivation along the exposed semiconductor crystal walls and/or damage incurred during the wafer dicing process, thermal- and/or strain-induced non-uniformities, and differences in the sizes of the pixels. In some detectors, the pixels along the edges of the radiation sensor are often smaller than other pixels of the radiation sensor in order to maintain consistent center-to-center pixel spacing when multiple abutting radiation sensors are assembled into a larger-area array. At higher tube currents, an additional factor that can contribute to pixel-to-pixel count non-uniformities is differences in the dead time, r, between different pixels, as described in further detail below.

Figure 8B:
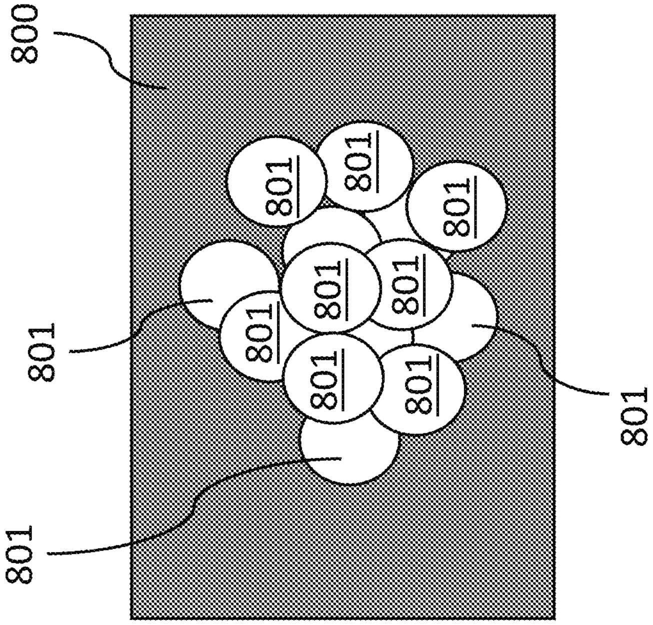
FIG. 8B schematically illustrates an anode-side surface of a semiconductor device material and a plurality of electron clouds in a high photon flux environment
Figure 8A:
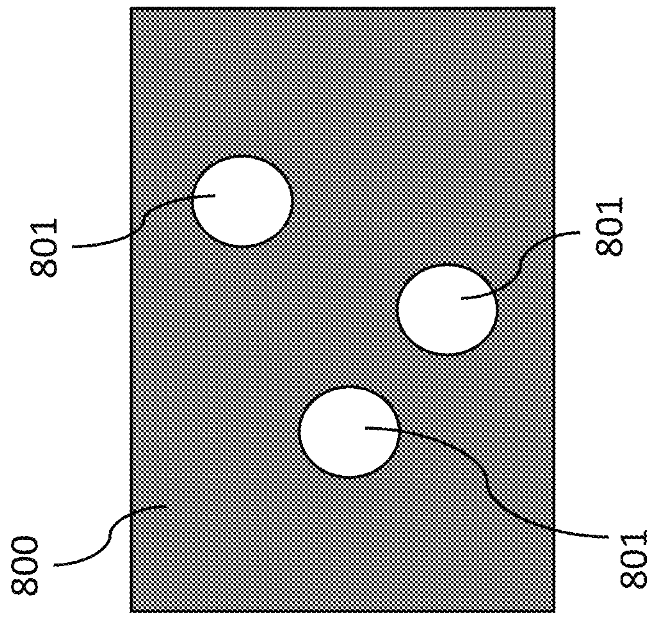
FIG. 8A schematically illustrates an anode-side surface of a semiconductor device material and a plurality of electron clouds in a low photon flux environment.

Previously, the discussion of the dead time, r, has focused on the pixel detector circuitry (e.g., an above-described ASIC 130), where the deadtime, r, is the minimum time interval that two consecutive counts must be separated by in order to be registered as two different photon interaction events by the detector circuitry. However, a more accurate model of the deadtime, r, also accounts for the deadtime that occurs within the radiation sensor material itself (e.g., within the CZT crystal). This is schematically illustrated by FIGS. 8A and 8B, which illustrate the anode-side surface 800 of a semiconductor detector material (e.g., an above-described CZT semiconductor crystal 208). As discussed above, each photon absorbed by the detector material creates an electron cloud 801 of certain size. At the start of the photo-electric effect this cloud 801 is small (e.g., 5-10 μm, depending on the photon energy) but it grows due to diffusion and electron repulsion as the cloud drifts towards the anode-side surface 800 of the detector material. Close to the anode-side surface 800 of the detector material, the electron cloud 801 may reach 30-150 μm in size, depending on sensor thickness and other parameters.

FIG. 8A schematically illustrates a plurality of electron clouds 801 in a low photon flux environment. In such a low flux environment, it is unlikely that multiple photon interaction events will occur nearly simultaneously within a close distance to one another (i.e., a distance that is smaller than the sizes of the respective electron clouds produced by the photon interaction events). However, in a high photon flux environment, there is a much greater likelihood of multiple photon interaction events occurring closely in time and space. In such instances, the electron clouds 801 from the multiple photon interaction events may "merge" by overlapping with one another as the clouds grow in size and drift towards the anode-side surface 800 of the detector material. This is illustrated in FIG. 8B, which shows a number of electron clouds 801 that overlap in space. In such cases, instead of the read-out circuitry detecting multiple individual photon interaction events, a single large charge packet comprised of the overlapping charge clouds 801 will be sensed by the read-out circuitry, and thus only a single photon interaction event will be registered by the read-out circuitry. This is effectively a pileup event that occurs within the sensor material rather than due to the deadtime characteristics of the read-out electronics. This effect may be considered non-paralyzable because the pile-up occurs entirely within the detector material without the read-out electronics being involved.

Accordingly, a more accurate model of the deadtime for the entire detection chain of the radiation detector (i.e., $\tau_{total}$) should account for the deadtime contribution of the sensor material, $\tau_{sensor}$, in addition to the deadtime of the read-out electronics, $\tau_{ASIC}$. Thus, for a detector exhibiting non-paralyzable behavior, the model of the total measured count rate, M, in Equation 1 may be alternatively expressed as:

$$M = T/(1 + T\times\tau_{sensor}))\times T/(1 + T\times\tau_{ASIC})) \quad \text{[Eq4]}$$

Similarly, for a detector exhibiting paralyzable behavior, the model of the total measured count rate, M, in Equation 4 above may be alternatively expressed as:

$$M = T/(1 + T\times\tau_{sensor}))\times T\times e\,\hat{}\,(-T\times\tau_{ASIC}) \quad \text{[Eq5]}$$

Thus, the total deadtime, $\tau_{total}$, of a direct detection photon-counting pixelated detector may vary on a pixel-to-pixel basis. Such variations may contribute to the above-described pixel-to-pixel photon count non-uniformities during high photon-flux conditions and may lead to a higher dispersion of the output count rate (OCR) across different output channels of the read-out circuitry.

Standard calibration processes for direct detection photon-counting pixelated detectors include calibrating the deadtime in each channel of the readout circuitry (e.g., ASIC 130) such that $\tau_{ASIC}$ is identical for every channel. However, it is generally not possible to do the same for the deadtime contribution of the sensor material, $T_{sensor}$, since the pixel-to-pixel variations in $\tau_{sensor}$ are the result of manufacturing variations and other physical differences in the sensor material. Accordingly, even after calibration of the ASIC 130, the variations in the total deadtime, $\tau_{total}$, in the data acquisition chain across different detector channels may be significant, such as up to ±20% or more.

Figure 9C:
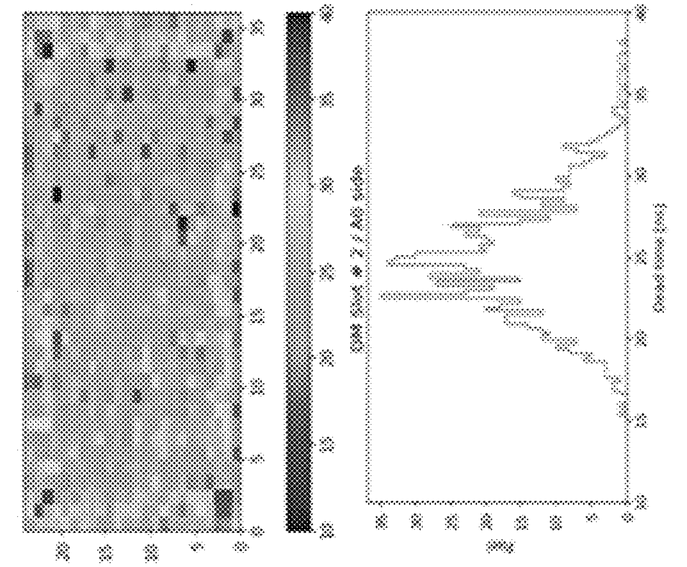
FIGS. 9A-9C are heat maps and histogram plots showing the distribution of measured total deadtime values for a pixelated radiation detector according to various embodiments of the present disclosure.
Figure 9B:
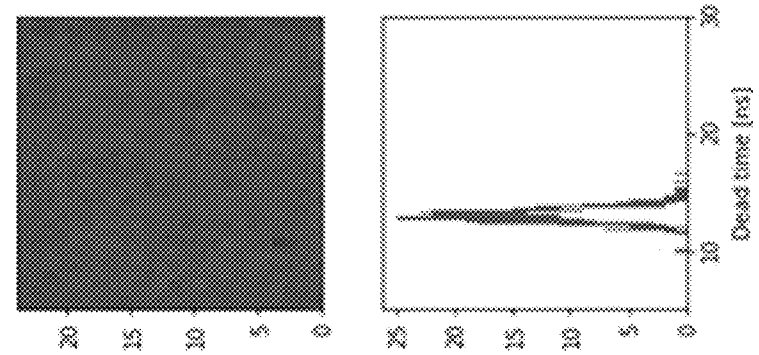
Figure 9A:
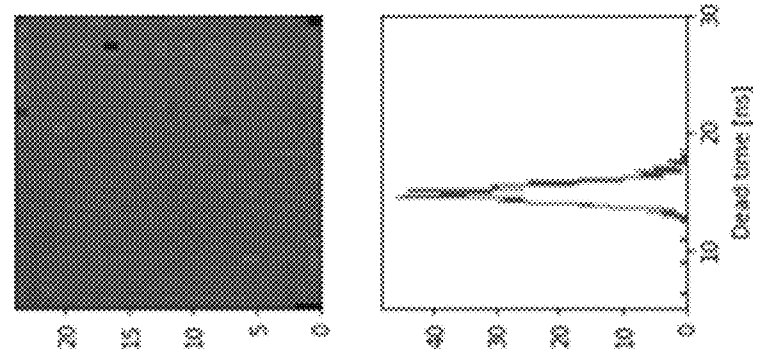

FIGS. 9A-9C illustrate results of evaluations of pixelated direct-detection detectors determine a total deadtime, $\tau_{total}$, of each pixel. The evaluations were performed using pixelated radiation detectors in which the detector read-out electronics (i.e., an ASIC 130) were calibrated to provide an identical deadtime, $\tau_{ASIC}$, on each of the ASIC read-out channels. Histogram plots showing the distribution of measured $\tau_{total}$ values are shown on the bottom of each of FIGS. 9A-9C, and heat maps visually depicting measured $\tau_{total}$ values for each pixel as colors are shown on the top of each of FIGS. 9A-9C. The evaluations were performed using a pulser. In all three examples, the target $\tau_{total}$ deadtime was 16 ns. In the examples of 9A and 9B, the distribution of measured $\tau_{total}$ values is relatively tight with mode values that are fairly close to the target value of 16 ns. However, in the example of FIG. 9C, the measured $\tau_{total}$ values tend to be significantly higher than the target value of 16 ns. Further, there is a wide distribution in measured $\tau_{total}$ values, where $\tau_{total}$ values of individual pixels range from −15 ns to −38 ns. Since prior to the evaluation, the read-out circuitry was calibrated such that each read-out channel of the ASIC included the same $\tau_{ASIC}$ deadtime, the pixel-to-pixel variation in the measured $\tau_{total}$ values is due almost entirely to variations in the deadtime of the sensor material (e.g., CZT).

In one embodiment, a method of calibrating a pixelated radiation detector (120, 200) containing a plurality of pixel detectors (126, 202) electrically connected to a plurality of respective read-out channels of detector read-out circuitry (e.g., ASIC 130) includes determining a sensor material 125 deadtime, $\tau_{sensor}$, for each of the plurality of pixel detectors (126, 202), and adjusting the respective read-out channel deadtime, $\tau_{ASIC}$, based on the determined sensor material deadtime, $\tau_{sensor}$, of the respective one of the plurality of pixel detectors (126, 202), such that a total deadtime, $\tau_{total}$ of each pixel detector (126, 202) including a sum of the respective sensor material deadtime, $\tau_{sensor}$, and the respective read-out channel deadtime, $\tau_{ASIC}$, varies by less than ±5% from each other. In other words, after the adjustment step, a first pixel detector (126, 202) having the lowest total deadtime in the pixelated radiation detector (120, 200) and a second pixel detector (126, 202) having the highest total deadtime in the same pixelated radiation detector (120, 200) have total deadtime values within five percent of each other, while the sensor material deadtime of the first and second pixel detectors differs by more than five percent (e.g., by more than 10 percent), and the read out channel deadtimes of the first and second pixel detectors also differs by more than five percent (e.g., by more than 10 percent).

FIG. 10 illustrates an embodiment method 1000 which includes additional steps for calibrating the pixelated radiation detector (e.g., 120, 200) to provide improved equalization of the output count rate (OCR) of the detector. In some embodiments, the method 1000 may be implemented using a processing device, such as a processor of an imaging X-ray detector (e.g., control unit 170 and/or computer device 160) or of an X-ray imaging system (e.g., system 100) including a radiation detector (e.g., 120, 200) comprised of an array of pixel detectors (e.g., 126, 202). The method 1000 may be performed as part of factory acceptance testing and/or as part of periodic or run-time calibration operations.

In operations of block 1002, a pixelated radiation detector (e.g., 120, 200) having an initial deadtime calibration of the detector read-out circuitry (i.e., ASIC 130) may be exposed to ionizing radiation for an exposure period (i.e., a period of collecting counts) to obtain a set of detection counts from pixel detectors of the radiation detector (120, 200). For example, an X-ray source may be operated at a constant tube current to generate a beam of X-ray radiation having substantially uniform flux that may be directed at the radiation detector (120, 200) during the exposure period. In various embodiments, the radiation directed at the radiation detector (120, 200) may have a sufficiently high flux such that the OCR-ICR relationship of the radiation detector is non-linear during at least a portion of the exposure period. In some embodiments, the initial deadtime calibration of the detector read-out circuitry 130 may include calibrating the detector read-out circuitry 130 prior to the exposure period such that each of the read-out channels of the circuitry 130 that reads-out the photon count values for different pixel detectors (or groups of pixel detectors) of the radiation detector (120, 200) has the same deadtime $\tau_{ASIC}$.

The set of detection counts may include count data for multiple different pixel detectors of the radiation detector (120, 200), such as all of the pixel detectors of the radiation detector (120, 200). In some embodiments, set of detection counts may include count data obtained over a range of different photon fluxes (e.g., at different X-ray tube current settings) for each pixel detector, such as described above with reference to FIG. 7. For an energy-discriminating radiation detector, the set of detection counts may include count data for different energy bins for each pixel detector. In some embodiments multiple exposures may be obtained and the count measurements may be averaged over multiple exposures to obtain a set of detection counts that includes an average of photon detection counts for different pixel detectors of the radiation detector (120, 200).

In operations of block 1004, the set of detection counts may be analyzed to identify a first group of one or more pixel detectors (e.g., one pixel or plural pixel detectors) of the radiation detector (120, 200) having a relatively low output count rate (OCR) and a second group of one or more pixel detectors of the radiation detector (120, 200) having a relatively high OCR. In one non-limiting example, an average OCR may be calculated for all of the pixel detectors of the radiation detector (120, 200) for photon counts detected at one or more photon fluxes (e.g., X-ray tube currents) and/or within one or more energy bins. Detector pixels having an OCR below the average OCR by more than a predetermined threshold value may be identified and sorted into the first group, and detector pixels having an OCR above the average OCR by more than a threshold value may be identified and sorted into the second group. Other methods for sorting pixel detectors into the first and second groups may also be utilized. For example, a pre-determined number or percentage of the detector pixels having the lowest OCR values may be sorted into the first group, while a pre-determined number or percentage of the detector pixels having the highest OCR values may be sorted into the second group. While two groups are described, it should be noted that in other embodiments, three or more groups, such as four to six groups may be identified.

In operations of block 1006, the deadtime calibration of the detector read-out circuitry 130 may be adjusted to decrease the deadtime $\tau_{ASIC}$ of one or more read-out channels that read-out photon counts of the first group of one or more pixel detectors and increase the deadtime $\tau_{ASIC}$ of one or more read-out channels that read-out photon counts of the second group of one or more pixel detectors. As discussed above, the pixel-to-pixel variation in the OCR of the pixelated radiation detector (120, 200) may be due, at least in part, to manufacturing variations and other physical differences in the sensor material (e.g., CZT). As a result of these variations, the total deadtime (i.e., $\tau_{total}$, or $\tau_{ASIC}+\tau_{sensor}$) may vary between different pixel detectors of the radiation sensor (120, 200) even when the detector read-out circuitry 130 is calibrated to provide the same deadtime $\tau_{ASIC}$ for each of the read-out channels. This variation in OCR between the different pixel detectors may be compensated for by increasing the deadtime $\tau_{ASIC}$ in read-out channels of the read-out circuitry 130 that read-out the photon counts of pixel detectors having a relatively high OCR, and by decreasing the deadtime $\tau_{ASIC}$ in read-out channels of the read-out circuitry 130 that read-out the photon counts of pixel detectors having a relatively low OCR. Increasing the deadtime $\tau_{ASIC}$ in the high-OCR read-out channels results in a decrease of the OCR for the corresponding pixel detectors (i.e., by increasing the frequency of pile-up events and thereby increasing the count losses) while decreasing the deadtime $\tau_{ASIC}$ in the low-OCR read-out channels results in an increase the OCR for the corresponding pixel detectors (i.e., by decreasing the frequency of pile-up events and thereby decreasing the count losses). Accordingly, a more uniform OCR spread across each of the pixel detectors of the radiation detector (120, 200) may be achieved.

In some embodiments, the deadtimes $\tau_{ASIC}$ of the read-out channels of the radiation detector (120, 200) may be adjusted by modifying a delay line register setting (e.g., by adjusting the ASIC clock) in the respective read-out channels. The increase(s) and/or decrease(s) in the deadtimes $\tau_{ASIC}$ of the selected read-out channels may be in uniform time increments or may be variable based on the measured OCR of the associated pixel detectors. For example, pixel detectors having the lowest measured OCR may be provided with the largest decreases in ASIC channel deadtime settings and pixel detectors having the highest measured OCR may be provided with the largest increases in ASIC channel deadtime settings. In some embodiments, the specific deadtime adjustment for each output channel may be determined using a formula based on the difference between the measured OCR of particular pixel detectors and an average OCR of all of the pixel detectors of the radiation detector (120, 200).

In some embodiments, the deadtime settings of different output channels of the detector read-out circuitry 130 may be adjusted using an iterative process that is intended to minimize the OCR spread across different pixel detectors of the radiation detector (120, 200). FIG. 11 illustrates an embodiment method 1100 for calibrating a pixelated radiation detector (120, 200) that includes iteratively adjusting the deadtime settings to provide improved equalization of the output count rate (OCR) of the detector. In operations of block 1102, a baseline set of detection counts from pixel detectors of a pixelated radiation detector (120, 200) may be obtained. This may include, for example, exposing the radiation detector (120, 200) to ionizing radiation for an exposure period to obtain a set of detection counts as described above with reference to block 1002 of method 1000.

In operations of block 1104, a deadtime setting of at least one read-out channel of the read-out circuitry 130 of the radiation detector (120, 200) may be modified based on the baseline set of detection counts. In various embodiments, the deadtime setting may be adjusted by increasing the deadtime $\tau_{ASIC}$ in read-out channels of the read-out circuitry 130 that read-out the photon counts of pixel detectors having a relatively high OCR in the baseline set of detection counts, and by decreasing the deadtime $\tau_{ASIC}$ in read-out channels of the read-out circuitry 130 that read-out the photon counts of pixel detectors having a relatively low OCR in the baseline set of detection counts, as described above with reference to block 1004 of method 1000.

In operations of block 1106, an updated set of detection counts from pixel detectors of the pixelated radiation detector (120, 200) may be obtained. In various embodiments, the updated set of detection counts may be obtained under similar or identical conditions as the baseline set of detection counts, but with adjusted deadtime settings for one or more read-out channel of the read-out circuitry 130 of the radiation detector (120, 200). For example, the updated set of detection counts may be obtained by exposing the radiation detector (120, 200) to the same photon flux (e.g., X-ray tube current setting) as was used to obtain the initial set of detection counts.

In operations of block 1108, an OCR spread between different pixel detectors of the radiation detector (120, 200) may be determined based on the updated set of detection counts. The OCR spread may include, for example, a standard deviation of the measured set of detection counts for the different pixel detectors of the radiation detector (120, 200), a difference between the highest count value and the lowest count value within the set of detection counts, or any other method for characterizing and/or quantifying the inter-pixel variation in the OCR in the measured set of detection counts. In some embodiments, the OCR spread may be stored in a memory.

In operations of determination block 1110, a determination may be made as to whether or not the OCR spread between different pixel detectors of the radiation detector (120, 200) meets an acceptance criteria. The acceptance criteria may represent a desired degree of uniformity in the pixel-to-pixel OCR of the radiation detector (120, 200). In some embodiments, the acceptance criteria may include, for example, a threshold or target value of the OCR spread, such as a maximum standard deviation of the detection counts of the different pixel detectors and/or a maximum difference between the highest and lowest detection counts of the pixel detectors. The acceptance criteria may be a user-defined criteria that may be stored in a memory. The determination as to whether or not the OCR spread meets the acceptance criteria may be made by comparing the OCR spread determined in block 1106 to the pre-defined acceptance criteria. When the OCR spread is determined not to meet the acceptance criteria (i.e., determination block 1110="No"), then the method 1100 may return to block 1104. The deadtime settings of at least one read-out channel of the read-out circuitry 130 may be modified based on the updated set of detection counts in block 1104, an additional updated set of detection counts may be obtained in block 1106, an updated OCR spread for the additional updated set of detection counts may be determined in block 1108, and a determination may be made as to whether or not the updated OCR spread meets the acceptance criteria in block 1110. This process may continue iteratively until the OCR spread is determined to meet the acceptance criteria (i.e., determination block 1110="Yes"). When the OCR spread is determined to meet the acceptance criteria (i.e., determination block 1110="Yes"), the method 1110 may end at block 1112.

Figure 12:
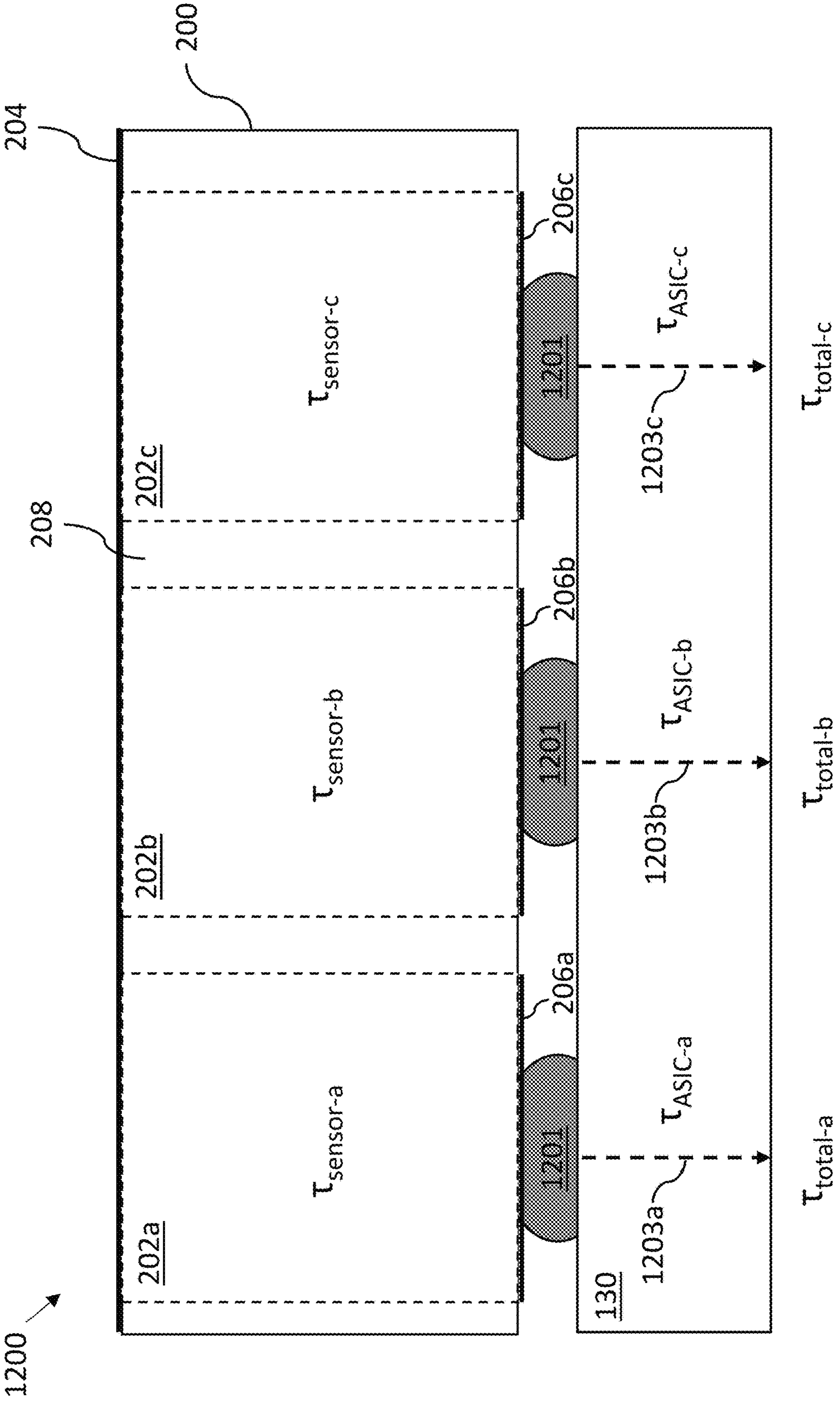
FIG. 12 is a vertical cross-section view of a portion of a pixelated radiation detector schematically illustrating a radiation sensor electrically coupled to a read-out circuit according to various embodiments of the present disclosure.

FIG. 12 is a vertical cross-section view of a portion of a pixelated radiation detector 1200 schematically illustrating a radiation sensor 200 electrically coupled to a read-out circuit (e.g., ASIC) 130. The radiation sensor 200 may be similar to radiation sensor 200 described above with reference to FIGS. 2 to 3B, and may include a plurality of pixel detectors 202*a*-202*c* formed by respective anodes 206*a*-206*c* located over a surface of a semiconductor crystal 208 (e.g., CZT). The radiation sensor 200 may be mounted to a read-out circuit 130 (i.e., ASIC) via a plurality of connecting members (e.g., solder material portions 1201). The read-out circuit 130 may include a plurality of read-out channels 1203*a*-1203*c*, where each read-out channel 1203*a*-1203*c* may be electrically connected to a respective anode 206*a*-206*c* of a pixel detector 202*a*-202*c* of the radiation sensor 200 and may be configured to read-out photon count data for the pixel detector 202*a*-202*c*. Each read-out channel 1203*a*, 1203*b* and 1203*c* may have a respective deadtime, $\tau_{ASIC-a}$, $\tau_{ASIC-b}$ and $\tau_{ASIC-c}$, which is the minimum time interval that two consecutive counts must be separated by in order to be registered as two different photon counts by the detector read-out circuitry 130. The deadtime, $\tau_{ASIC-a}$, $\tau_{ASIC-b}$ and $\tau_{ASIC-c}$, of each read-out channel 1203*a*-1203*c* may be individually set by a user. Although pixelated radiation detector 1200 of FIG. 12 illustrates three pixel detectors 202*a*, 202*b* and 202*c*, it will be understood that a pixelated radiation detector 1200 may include any number of pixel detectors.

As discussed above, the radiation sensor 200 may also have a characteristic deadtime, $\tau_{sensor}$, due to pile-up effects that may occur entirely within the sensor material 208. As further discussed above, the sensor deadtime, $\tau_{sensor}$, may vary between different pixel detectors 202*a*-202*c* due to manufacturing variations and/or differences in the sensor material 208. Accordingly, each of the pixel detectors 202*a*-202*c* may have a characteristic sensor material deadtime, $\tau_{sensor-a}$, $\tau_{sensor-b}$, and $\tau_{sensor-c}$, where $\tau_{sensor-a}$, $\tau_{sensor-b}$, and $\tau_{sensor-c}$ may not be equal. A total deadtime, $\tau_{total}$, for each pixel detector 202*a*-202*c* may include both the sensor material deadtime $\tau_{sensor-a}$, $\tau_{sensor-b}$, and $\tau_{sensor-c}$ of the pixel detector 202*a*-202*c* in addition to the deadtime $\tau_{ASIC-a}$, $\tau_{ASIC-b}$ and $\tau_{ASIC-c}$ of the corresponding read-out channel 1203*a*-1203*c* of the read-out circuitry 130.

In various embodiments, the deadtimes, $\tau_{ASIC-a}$, $\tau_{ASIC-b}$ and $\tau_{ASIC-c}$, of the read-out channels 1203*a*, 1203*b* and 1203*c* may be non-uniform to compensate for differences in the sensor material deadtimes $\tau_{sensor-a}$, $\tau_{sensor-b}$, and $\tau_{sensor-c}$ of the pixel detectors 202*a*-202*c*. In some embodiments, the deadtimes, $\tau_{ASIC-a}$, $\tau_{ASIC-b}$ and $\tau_{ASIC-c}$, of the read-out channels 1203*a*, 1203*b* and 1203*c* of the read-out circuitry 130 may vary by at least about ±5%, such as at least about ±10%, including by up to ±15%, by up to ±20%, such as by up to ±25% or more. In some embodiments, the total deadtimes, $\tau_{total-a}$, $\tau_{total-b}$, and $\tau_{total-c}$ for each pixel detector 202*a*-202*c* of the pixelated radiation detector 1200 may be substantially equal (e.g., vary by less than ±5%, such as less than ±2%, including by about ±1% or less, such as zero to ±1%). In other words, $\tau_{sensor-a}+\tau_{ASIC-a}\approx\tau_{sensor-b}+\tau_{ASIC-b}\approx\tau_{sensor-c}+\tau_{ASIC-c}$, and therefore, $\tau_{total-a}\approx\tau_{total-b}\approx\tau_{total-c}$, where the symbol "≈" stands for equal or substantially equal (e.g., different by 5 percent or less). Accordingly, by providing a substantially uniform total deadtime, $\tau_{total}$, across all of the pixel detectors 202*a*-202*c* of the radiation detector 1200, improved equalization of the output count rate (OCR) of the radiation detector 1200 may be achieved.

Figure 13:
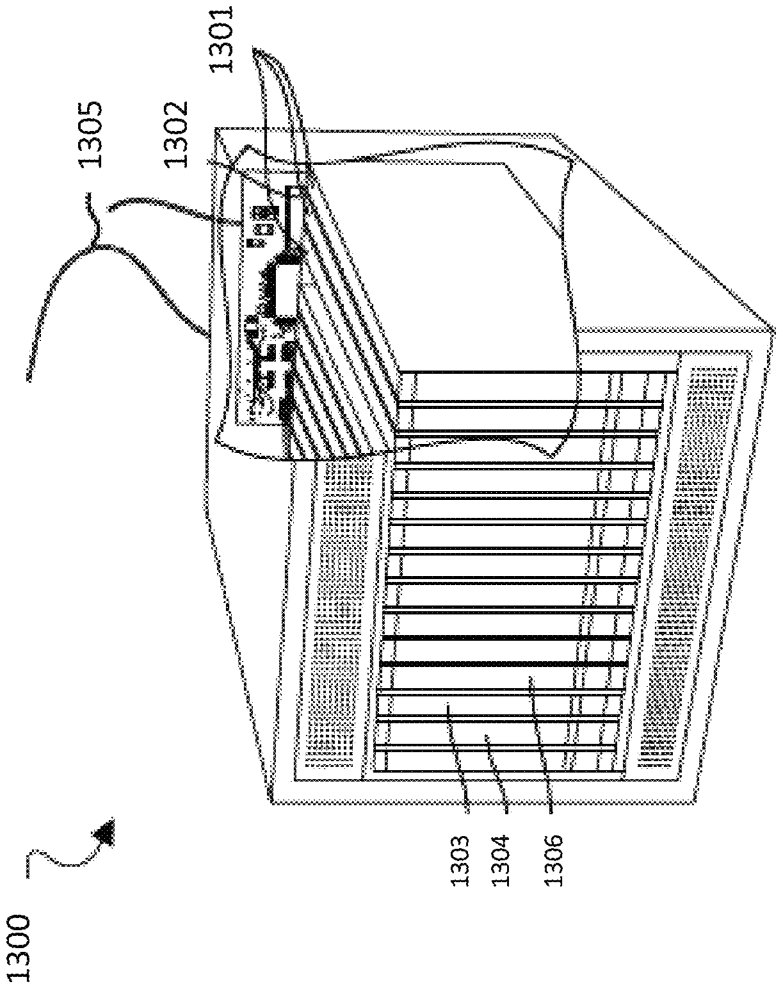
FIG. 13 is a component block diagram illustrating an example server suitable for use with the various embodiments.

The various embodiments (including, but not limited to, the embodiment methods described above with reference to FIGS. 10 and 11) may be implemented in computing systems, such as any of a variety of commercially available computers 1300 as illustrated in FIG. 13. Such a computer 1300 typically includes one or more processors 1301 coupled to volatile memory 1302 and a large capacity nonvolatile memory, such as a disk drive 1304. As illustrated in FIG. 13, one or more processors 1301 may be added to the computer 1300 by inserting them into the racks of the assembly. The computer 1300 may also include a floppy disc drive, compact disc (CD) or digital versatile disc (DVD) disc drive 1306 coupled to the one or more processors 1301. The computer 1300 may also include network access ports 1303 coupled to the one or more processors 1301 for establishing network interface connections with a network 1305, such as a local area network coupled to other computers and servers, or the Internet.

The present embodiments may be implemented in systems used for medical imaging, such as CT imaging, as well as for non-medical imaging applications, such as industrial inspection applications. Any direct conversion radiation sensors may be employed such as radiation sensors employing Si, Ge, GaAs, CdTe, CdZnTe, and/or other similar semiconductor materials.

The radiation detectors of the present embodiments may be used for medical imaging, such as in Low-Flux applications in Nuclear Medicine (NM), whether by Single Photon Emission Computed Tomography (SPECT) or by Positron Emission Tomography (PET), or as radiation detectors in High-Flux applications as in X-ray Computed Tomography (CT) for medical applications, and for non-medical imaging applications, such as in baggage security scanning and industrial inspection applications.

Computer program code or executable instructions for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Embodiments may be implemented as program code or processor-executable instructions stored on a non-transitory processor-readable storage medium that are configured to cause a processor coupled to a pixelated radiation detector, such as a processor or analysis unit of an X-ray imaging system, to perform operations of any of the various embodiments. Program code or processor-executable instructions stored on a non-transitory processor readable storage medium as used in this application may refer to machine language code (such as object code) whose format is understandable by a processor. Non-transitory processor-readable storage medium include any form of media used for storing program code or processor-executable instructions including, for example, RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a processor or computer.

While the disclosure has been described in terms of specific embodiments, it is evident in view of the foregoing description that numerous alternatives, modifications and variations will be apparent to those skilled in the art. Each of the embodiments described herein may be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

The invention claimed is:

1. A method of calibrating a pixelated radiation detector comprising a plurality of pixel detectors electrically connected to a plurality of respective read-out channels of detector read-out circuitry, the method comprising: determining a sensor material deadtime, τsensor, for each of the plurality of pixel detectors; and adjusting the respective read-out channel deadtime, τASIC, based on the determined sensor material deadtime, τsensor, of the respective one of the plurality of pixel detectors, such that a total deadtime, τtotal of each pixel detector including a sum of the respective sensor material deadtime, τsensor, and the respective read-out channel deadtime, τASIC, varies by less than ±5% from each other; exposing the pixelated radiation detector comprising the detector read-out circuitry having an initial deadtime calibration to ionizing radiation for an exposure period to obtain a set of detection counts from the plurality of the pixel detectors of the radiation detector; analyzing the set of detection counts to identify a first group of one or more pixel detectors of the radiation detector having a relatively low output count rate (OCR) and a second group of one or more pixel detectors of the radiation detector having a relatively high OCR; and adjusting the deadtime calibration of the detector read-out circuitry to decrease the deadtime τASIC of one or more read-out channels that read-out photon counts of the first group of one or more pixel detectors and increase the deadtime τASIC of one or more read-out channels that read-out photon counts of the second group of one or more pixel detectors, wherein the analyzing the set of detection counts comprises calculating an average OCR for all of the pixel detectors of the radiation detector using the set of detection counts, sorting pixel detectors having an OCR below the average OCR by more than a predetermined threshold value into the first group of one or more detector pixels, and sorting detector pixels having an OCR above the average OCR by more than a threshold value into the second group of one or more detector pixels.

2. A method of calibrating a pixelated radiation detector comprising a plurality of pixel detectors electrically connected to a plurality of respective read-out channels of detector read-out circuitry, the method comprising: determining a sensor material deadtime, τsensor, for each of the plurality of pixel detectors; and adjusting the respective read-out channel deadtime, τASIC, based on the determined sensor material deadtime, τsensor, of the respective one of the plurality of pixel detectors, such that a total deadtime, τtotal of each pixel detector including a sum of the respective sensor material deadtime, τsensor, and the respective read-out channel deadtime, τASIC, varies by less than ±5% from each other; exposing the pixelated radiation detector comprising the detector read-out circuitry having an initial deadtime calibration to ionizing radiation for an exposure period to obtain a set of detection counts from the plurality of the pixel detectors of the radiation detector; analyzing the set of detection counts to identify a first group of one or more pixel detectors of the radiation detector having a relatively low output count rate (OCR) and a second group of one or more pixel detectors of the radiation detector having a relatively high OCR; and adjusting the deadtime calibration of the detector read-out circuitry to decrease the deadtime τASIC of one or more read-out channels that read-out photon counts of the first group of one or more pixel detectors and increase the deadtime τASIC of one or more read-out channels that read-out photon counts of the second group of one or more pixel detectors, wherein the analyzing the set of detection counts comprises sorting a pre-defined number or percentage of pixel detectors having the lowest OCR values into the first group of one or more detector pixels, and sorting a pre-defined number or percentage of pixel detectors having the highest OCR values into the second group of one or more detector pixels.

3. A method of calibrating a pixelated radiation detector, comprising:

- obtaining a baseline set of detection counts from pixel detectors of the pixelated radiation detector;
- modifying a deadtime setting of at least one read-out channel of read-out circuitry of the radiation detector based on the set of detection counts;
- obtaining an updated set of detection counts from the pixel detectors of the pixelated radiation detector;
- determining an OCR spread between different pixel detectors of the radiation detector based on the updated set of detection counts;
- determining whether the OCR spread meets an acceptance criterion;
- modifying the deadtime setting of at least one read-out channel of the read-out circuitry of the radiation detector based on the updated set of detection counts, obtaining an additional updated set of detection counts from the pixel detectors of the pixelated radiation detector, and determining the OCR spread between different pixel detectors of the radiation detector based on the additional updated set of detection counts in response to determining that the OCR spread does not meet the acceptance criterion; and
- ending the calibration of the pixelated radiation detector in response to determining that the OCR spread does meet the acceptance criterion.

4. The method of claim 3, wherein modifying the deadtime setting of at least one read-out channel of the read-out circuitry of the radiation detector comprises decreasing the deadtime of one or more read-out channels that read-out photon counts of a pixel detector having a relatively low OCR, and increasing the deadtime of one or more read-out channels that read-out photon counts of a pixel detector having a relatively high OCR.

* * * * *